US011157853B2

(12) United States Patent
Blomberg et al.

(10) Patent No.: US 11,157,853 B2
(45) Date of Patent: Oct. 26, 2021

(54) FORECASTING A TIME SERIES BASED ON ACTUALS AND A PLAN

(71) Applicant: International Business Machines Corporation, Armonk, NY (US)

(72) Inventors: Jeanette L. Blomberg, Portola Valley, CA (US); Neil H. A. Boyette, Oregon City, OR (US); Anca A. Chandra, Los Gatos, CA (US); Se Chan Oh, New York, NY (US); Hovey R. Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/427,158

(22) Filed: May 30, 2019

(65) Prior Publication Data
US 2019/0279134 A1  Sep. 12, 2019

Related U.S. Application Data

(63) Continuation of application No. 14/046,852, filed on Oct. 4, 2013, now Pat. No. 10,395,198.

(51) Int. Cl.
*G06Q 10/06* (2012.01)
(52) U.S. Cl.
CPC .............................. *G06Q 10/06315* (2013.01)
(58) Field of Classification Search
USPC .......................................................... 705/7
See application file for complete search history.

(56) References Cited

U.S. PATENT DOCUMENTS

| 5,652,842 | A | 7/1997 | Siegrist, Jr. et al. |
| 5,675,710 | A | 10/1997 | Lewis |
| 5,995,924 | A | 11/1999 | Terry |
| 6,151,582 | A | 11/2000 | Huang et al. |
| 6,920,464 | B2 | 7/2005 | Fox |

(Continued)

OTHER PUBLICATIONS

Min Qi, Guoqiang Peter Zhang, An investigation of model selection criteria for neural network time series forecasting, European Journal of Operational Research, vol. 132, Issue 3, 2001, pp. 666-680, (Year: 2001).*

(Continued)

*Primary Examiner* — Arif Ullah
(74) *Attorney, Agent, or Firm* — Sherman IP LLP; Kenneth L. Sherman; Hemavathy Perumal

(57) ABSTRACT

Embodiments of the present invention provide a system, method and computer program product for forecasting a time series based on actuals and a plan. A method comprises generating a first and a second sequence of segments that rise and fall alternately based on a first and a second sequence of data values over time, respectively. The first and second sequence of data values represent actual data for an ongoing project and estimated data for a planned project, respectively. The method further comprises aligning at least one segment of the second sequence of segments with at least one segment of the first sequence of segments, and adjusting the estimated data by replacing at least one segment of the second sequence of segments with a scaled version of at least one corresponding aligned segment of the first sequence of segments. The scaled version maintains an estimated total for the planned project.

15 Claims, 23 Drawing Sheets

(56) References Cited

U.S. PATENT DOCUMENTS

| | | |
|---|---|---|
| 7,194,320 B2 | 3/2007 | Lefebvre |
| 7,236,964 B2 | 6/2007 | Labreuche |
| 7,526,486 B2 | 4/2009 | Cushman et al. |
| 7,765,122 B2 | 7/2010 | Shan |
| 7,765,123 B2 | 7/2010 | Shan et al. |
| 7,870,004 B2 | 1/2011 | Kananghinis et al. |
| 7,885,848 B2 | 2/2011 | Kagan et al. |
| 7,996,398 B2 | 8/2011 | Ortega et al. |
| 8,315,972 B2 | 11/2012 | Chkodrov et al. |
| 8,341,008 B2 | 12/2012 | Oku |
| 8,412,493 B2 | 4/2013 | Duchenay et al. |
| 8,463,679 B2 | 6/2013 | Kaplan et al. |
| 8,484,115 B2 | 7/2013 | Aymeloglu |
| 8,615,434 B2 | 12/2013 | Benyamin et al. |
| 8,805,836 B2 | 8/2014 | Hore et al. |
| 8,862,196 B2 | 10/2014 | Lynn |
| 9,020,959 B2 | 4/2015 | Deng |
| 9,565,397 B2 | 2/2017 | Frink et al. |
| 9,898,767 B2 | 2/2018 | Psota et al. |
| 2003/0097329 A1 | 5/2003 | Nabe et al. |
| 2003/0163466 A1 | 8/2003 | Rajaraman et al. |
| 2004/0117235 A1 | 6/2004 | Shacham et al. |
| 2004/0117290 A1 | 6/2004 | Shacham et al. |
| 2005/0228707 A1 | 10/2005 | Hendrickson |
| 2005/0278255 A1 | 12/2005 | Hahn-Carlson et al. |
| 2006/0009993 A1 | 1/2006 | Guo et al. |
| 2006/0184493 A1 | 8/2006 | Shiffman et al. |
| 2006/0271582 A1 | 11/2006 | Collins |
| 2007/0118421 A1* | 5/2007 | Oku ............... G06Q 30/0202 705/7.31 |
| 2007/0156510 A1 | 7/2007 | Kim et al. |
| 2008/0243660 A1 | 10/2008 | Amemiya et al. |
| 2008/0243925 A1 | 10/2008 | Axe et al. |
| 2009/0024444 A1* | 1/2009 | Shan ............... G06Q 30/0202 705/7.31 |
| 2009/0234847 A1 | 9/2009 | Homma et al. |
| 2009/0248461 A1 | 10/2009 | Bartsch et al. |
| 2010/0057577 A1 | 3/2010 | Stefik et al. |
| 2010/0138807 A1 | 6/2010 | Bogdan |
| 2010/0312612 A1 | 12/2010 | Carr et al. |
| 2011/0040636 A1 | 2/2011 | Simmons et al. |
| 2011/0060603 A1 | 3/2011 | Capelli et al. |
| 2011/0082824 A1 | 4/2011 | Allison et al. |
| 2011/0126206 A1 | 5/2011 | Kato et al. |
| 2011/0231256 A1 | 9/2011 | Wang et al. |
| 2011/0231336 A1 | 9/2011 | Hu et al. |
| 2012/0029974 A1* | 2/2012 | Councill ............ G06Q 10/0631 705/7.35 |
| 2012/0116747 A1 | 5/2012 | Hadar et al. |
| 2012/0246638 A1* | 9/2012 | He ............... G06F 9/45558 718/1 |
| 2012/0284084 A1 | 11/2012 | Popkov et al. |
| 2012/0310681 A1 | 12/2012 | Simon et al. |
| 2012/0330996 A1 | 12/2012 | Chang et al. |
| 2013/0018830 A1 | 1/2013 | Dhurandhar |
| 2013/0060774 A1 | 3/2013 | Shepherd et al. |
| 2013/0060783 A1 | 3/2013 | Baum et al. |
| 2014/0122370 A1 | 5/2014 | Jamal et al. |
| 2014/0129325 A1 | 5/2014 | Zinger et al. |
| 2014/0207413 A1* | 7/2014 | Hamaoui ........... G06Q 30/0203 702/179 |
| 2014/0297528 A1* | 10/2014 | Agrawal ........... G06Q 20/40145 705/44 |
| 2015/0294246 A1 | 10/2015 | Guven Kaya et al. |
| 2015/0379429 A1 | 12/2015 | Lee et al. |
| 2015/0379430 A1 | 12/2015 | Dirac et al. |
| 2016/0275411 A1 | 9/2016 | Kim et al. |

OTHER PUBLICATIONS

Himberg, J., et al., "Time series segmentation for context recognition in mobile devices", Proceedings of the 2001 IEEE international Conference on Data Mining, ICDM 2001, Nov. 29, 2001-Dec. 2, 2001, pp. 1-8, United States.

Fu, T., "A review on time series data mining", Feb. 2011, Elsevier, Engineering Applications of Artificial Intelligence, pp. 164-181, vol. 24, Issue 1, United States.

Nagpaul, P.S., "Time Series Analysis in WinIDAMS", Apr. 2005, Untied Nations Organization for Education, Science, and Culture (UNESCO), pp. 1-47, France.

Mehta, K., "Top Down or Bottom Up? Consider Hybrid", Sep. 1, 2006, Information Management, pp. 1-4, United States.

Fink, E., "Indexing of Compressed Time Series", Jan. 1, 2004, Computer Science Department, Paper 616, pp. 1-26, Carenegie Mellon University, United States.

Keogh, E. et al., "An Online Algorithm for Segmenting Time Series", Proceedings of the 2001 IEEE International Conference on Data Mining, 2001, pp. 1-46, IEEE, United States.

Kahn, K. et al., "Revisiting Top-Down Versus Bottom-Up Forecasting", The Journal of Business Forecasting, Summer 1996, pp. 14-19, United States.

Pourabbas, E. et al., "Characterization of Hierarchies and Some Operators in OLAP Environment", DOLAP '99 Proceedings of the 2nd ACM International Workshop on Data Warehousing and OLPAP, pp. 1-17, ACM, United States.

Tsois, A. et al., "MAC: Conceptual Data Modeling for OLAP", Proceedings of the International Workshop on Design and Management of Data Warehouses (DMDW), Jun. 2001, pp. 1-11, United States.

Chen, X. et al. "Vector Symbolization Algorithm for Time Series Based on Segmentation Mode", China Academic Journal Electronic Publishing House, Feb. 2011, pp. 1-3, vol. 37, No. 4, National Knowledge infrastructure, CNKI, China (Abstract pg. 1).

Anonymous, "Smart data population in social way", Jun. 13, 2013, pp. 1-8, IP.corn, United States.

Motahari Nezhad, H.R. et al., "Heaith Identification and Outcome Prediction for Outsourcing Services Based on Textual Comments", Proceedings of the 2014 International Conference on Services Computing (SCC), Jun. 27, 2014-Jul. 2, 2014, pp. 1-8, IEEE, United States.

Chan, Y. et al., "Hardening the EWLM Performance Data", Feb. 2006, pp. 1-52, 2nd Edition, IBM.COM/redbooks, United States.

U.S. Corrected Notice of Allowability for U.S. Appl. No. 14/046,852 dated Jun. 24, 2019.

U.S. Corrected Notice of Allowability for U.S. Appl. No. 14/046,852 dated Jul. 3, 2019.

U.S. Corrected Notice of Allowability for U.S. Appl. No. 14/728,926 dated May 9, 2019.

U.S. Non-Final Office Action for U.S. Appl. No. 14/046,852 dated Jul. 17, 2015.

U.S. Final Office Action for U.S. Appl. No. 14/046,852 dated Jan. 6, 2016.

U.S. Advisory Action for U.S. Appl. No. 14/046,852 dated Mar. 21, 2016.

U.S. Non-Final Office Action for U.S. Appl. No. 14/046,852 dated May 20, 2016.

U.S. Final Office Action for U.S. Appl. No. 14/046,852 dated Dec. 2, 2016.

U.S.Notice of Allowance for U.S. Appl. No. 14/046,852 dated Apr. 17, 2019.

U.S. Non-Final Office Action for U.S. Appl. No. 14/046,843 dated Jul. 2, 2015.

U.S. Final Office Action for U.S. Appl. No. 14/046,843 dated Jan. 8, 2016.

U.S. Advisory Action for U.S. Appl. No. 14/046,843 dated Mar. 21, 2016.

U.S. Non-Final Office Action for U.S. Appl. No. 14/046,843 dated Jul. 6, 2016.

U.S. Final Office Action for U.S. Appl. No. 14/046,843 dated Jan. 11, 2017.

U.S. Non-Final Office Action for U.S. Appl. No. 14/046,843 dated Jul. 5, 2017.

U.S. Final Office Action for U.S. Appl. No. 14/046,843 dated Jan. 16, 2018.

(56) References Cited

OTHER PUBLICATIONS

U.S. Advisory Action for U.S. Appl. No. 14/046,843 dated Apr. 17, 2018.
U.S. Non-Final Office Action for U.S. Appl. No. 14/046,843 dated Jun. 26, 2018.
U.S. Notice of Allowance for U.S. Appl. No. 14/046,843 dated Jan. 24, 2019.
U.S. Non-Final Office Action for U.S. Appl. No. 14/728,926 dated Feb. 26, 2018.
U.S. Final Office Action for U.S. Appl. No. 14/728,926 dated Sep. 28, 2018.
U.S. Advisory Action for U.S. Appl. No. 14/728,926 dated Jan. 8, 2019.
U.S. Notice of Allowance for U.S. Appl. No. 14/728,926 dated Feb. 14, 2019.
U.S. Non-Final Office Action for U.S. Appl. No. 14/046,849 dated Jul. 1, 2015.
U.S. Final Office Action for U.S. Appl. No. 14/046,849 dated Feb. 8, 2016.
U.S. Non-Final Office Action for U.S. Appl. No. 14/046,861 dated Jun. 18, 2015.
U.S. Final Office Action for U.S. Appl. No. 14/046,861 dated Feb. 5, 2016.
U.S. Non-Final Office Action for U.S. Appl. No. 16/367,046 dated Mar. 19, 2021.
U.S. Final Office Action for U.S. Appl. No. 16/367,046 dated Jul. 30, 2021.

\* cited by examiner

70

| p | value |
|---|---|
| p[0] | 0 |
| p[1] | 0 |
| p[2] | 1 |
| p[3] | 0 |
| p[4] | -1 |
| p[5] | 0 |

71 → p[2] Indicates Peak Data Value
71 → p[4] Indicates Trough Data Value

| Segment | Total | Length | Character |
|---|---|---|---|
| First Segment | 6 | 3 | Peak/Rise |
| Second Segment | 3 | 2 | Trough/Fall |
| Third Segment | 1 | 1 | Neither |

Succinct Approximate Representation

```
┌─────────────────────────────────┐
│ Partition a Sequence of Cost    │
│ Values Over Time for a Service  │
│ Delivery Project into Multiple  │
│ Segments, Wherein Each          │ ─── 477
│ Segment Comprises a Contiguous  │
│ Subsequence of the Sequence of  │
│ Cost Values, and Wherein the    │
│ Segments Comprise At Least One  │
│ of a Segment That Rises to a    │
│ Peak Cost Value of the          │
│ Sequence of Cost Values and a   │
│ Segment That Falls to a Trough  │
│ Cost Value of the Sequence of   │
│ Cost Values                     │
└─────────────────────────────────┘
                ↓
┌─────────────────────────────────┐
│ Generate a Sequence of Segments │
│ That Rise and Fall Alternately  │
│ Based on the Segments, Wherein  │
│ the Sequence of Segments        │ ─── 478
│ Comprises a Segment That Rises  │
│ to a Peak Cost Value and is     │
│ Consecutively Followed by       │
│ Another Segment That Falls to a │
│ Trough Cost Value               │
└─────────────────────────────────┘
                ↓
┌─────────────────────────────────┐
│ Based on the Sequence of        │
│ Segments, Generate a            │
│ Corresponding Sequence of Total │
│ Cost Values Representing a      │ ─── 479
│ Succinct Approximate            │
│ Representation of the Sequence  │
│ of Cost Values, Wherein Each    │
│ Total Cost Value Comprises a    │
│ Sum of Cost Values for a        │
│ Corresponding Segment of the    │
│ Sequence of Segments            │
└─────────────────────────────────┘
```

FIG. 6C

FORECASTING A TIME SERIES BASED ON ACTUALS AND A PLAN

FIELD OF THE INVENTION

The present invention generally relates to forecasting costs associated with service delivery, and more particularly, to a system, method and computer program product for forecasting a time series based on actuals and a plan.

BACKGROUND

A service provider offers services (e.g., Information Technology services) to customers. A service delivery engagement involves the delivery of services offered. A service delivery engagement may be complex. For example, the delivery of services may span many years (e.g., a multi-year service delivery project). As another example, the delivery of services may involve delivery and/or customer locations in multiple countries (e.g., a multi-country service delivery project). Modeling cost estimations for a service delivery engagement is based on multiple variables, such as socio-economic conditions of delivery and/or customer locations, demand for services offered, infrastructure needed to support the services offered, etc.

BRIEF SUMMARY

Embodiments of the present invention provide a system, method and computer program product for forecasting a time series based on actuals and a plan. A method comprises generating a first and a second sequence of segments that rise and fall alternately based on a first and a second sequence of data values over time, respectively. The first and second sequence of data values represent actual data for an ongoing project and estimated data for a planned project, respectively. The method further comprises aligning at least one segment of the second sequence of segments with at least one segment of the first sequence of segments, and adjusting the estimated data by replacing at least one segment of the second sequence of segments with a scaled version of at least one corresponding aligned segment of the first sequence of segments. The scaled version maintains an estimated total for the planned project.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5A illustrates an example peak and trough indicator array for an example input time series, according to an embodiment of the present invention;

FIG. 5B illustrates an example segment table for an example input time series, according to an embodiment of the present invention;

FIG. 6C illustrates a flowchart of an example process for generating a succinct approximate representative for an input series.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. One or more exemplary embodiments of the invention are described below in detail. The disclosed embodiments are intended to be illustrative only since numerous modifications and variations therein will be apparent to those of ordinary skill in the art.

Embodiments of the invention relate to forecasting costs associated with service delivery, and more particularly, to a system, method and computer program product for forecasting a time series based on actuals and a plan. For a first series comprising a sequence of actual data values, embodiments of the invention generate a corresponding first sequence of segments that rise and fall alternatively. For a second series comprising a sequence of estimated data values, embodiments of the invention generate a corresponding second sequence of segments that rise and fall alternatively. Embodiments of the invention align at least one segment of the second sequence of segments with at least one corresponding segment of the first sequence of segments. Embodiments of the invention adjust the second series based on the aligned segments. The adjusted second series comprises revised estimated data values.

Figure 1:
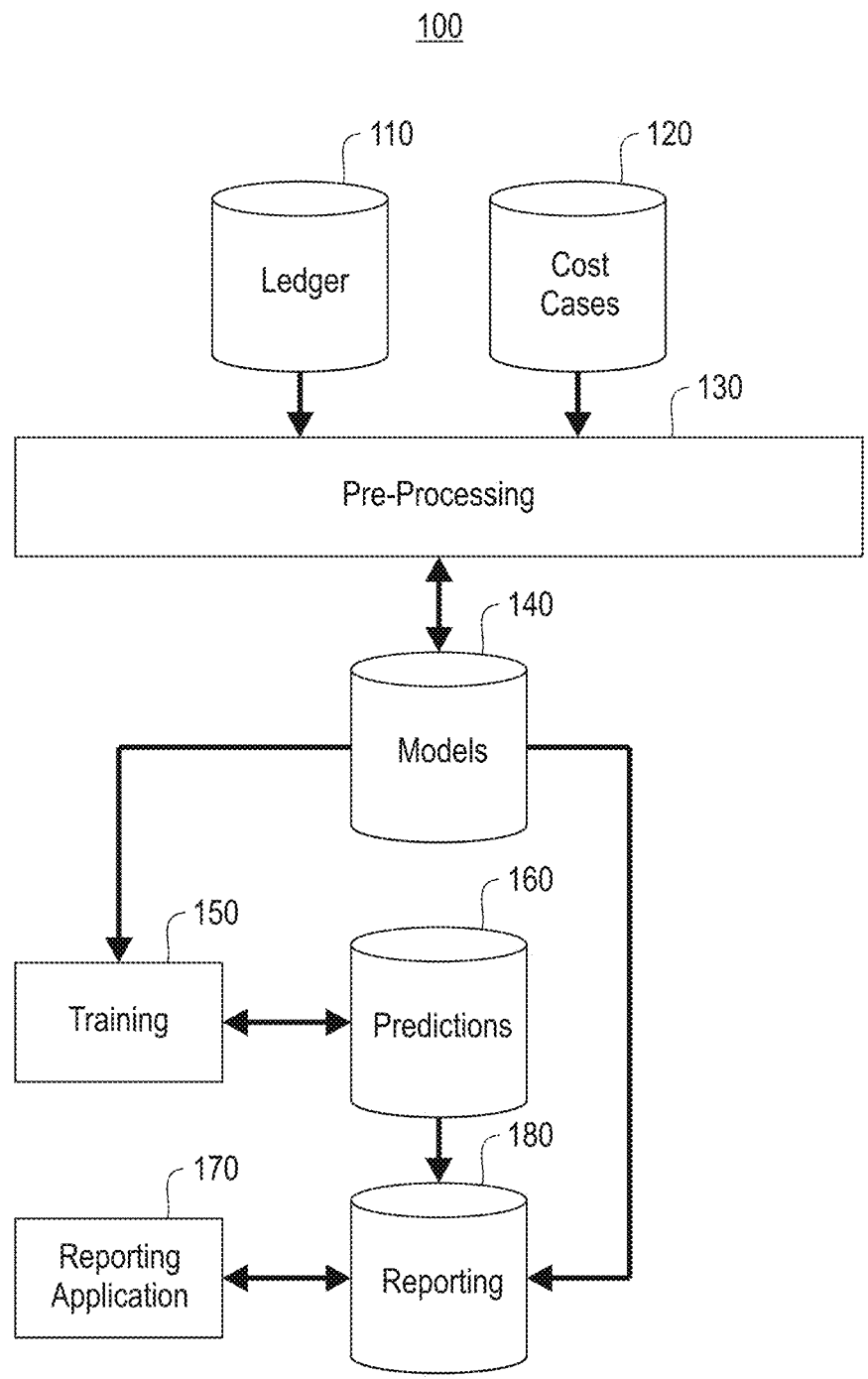
FIG. 1 illustrates an example system for forecasting costs associated with service delivery, according to an embodiment of the present invention.

Referring now to the drawings, FIG. 1 illustrates an example system 100 for forecasting costs associated with service delivery, according to a preferred embodiment of the present invention. The system 100 comprises a ledger storage unit 110, a cost cases storage unit 120, a pre-processing unit 130, a models storage unit 140, a training unit 150, a predictions storage unit 160, a reporting application 170, and a reporting storage unit 180.

Forecasting long-term costs associated with a service delivery project requires a sizable amount of input data, such as ledger data, meta data related to service contracts, and cost cases. The ledger storage unit 110 maintains ledger data representing actual data, such as actual costs or revenue, for one or more projects. For example, the ledger data maintained may comprise a set of monthly entries of cost or revenue incurred by an ongoing service delivery project. In one embodiment, the ledger storage unit 110 resides on one or more server databases.

The cost cases storage unit 120 maintains one or more cost cases. A cost case is a detailed plan providing cost estimations for a planned project (e.g., a planned service delivery project). A cost case is typically developed by a service provider during engagement with a potential customer and before any contract negotiation or signing. In one embodiment, the cost cases storage unit 120 resides on one or more server databases.

A cost case includes data relating to a potential customer and data describing services offered to the potential customer. For example, a cost case may include multiple line items describing service components for a planned project (e.g., a list of prices for various service components related to Information Technology (IT) services, such as storage management, middleware support, etc.).

The input data may become available at different intervals. For example, the system 100 may acquire/update ledger data, service contract meta data and cost cases for the ledger storage unit 110 and the cost cases storage unit 120 on a monthly basis.

The pre-processing unit 130 is configured to pre-process input data. Pre-processing operations that the pre-processing unit 130 is configured to perform include smoothing input data, identifying terminating service contracts and replacements for the terminating service contracts, generating (i.e., constructing) typical models, extrapolating actual data into the past, and generating estimate models. In one embodiment, the pre-processing unit 130 may perform multiple pre-processing operations in parallel.

The models storage unit 140 maintains one or more estimate models generated by the pre-processing unit 130. In one embodiment, the models storage unit 140 resides on one or more server databases.

The training unit 150 is configured to train each estimate model maintained in the models storage unit 140 to better fit actual data. Each estimate model has a corresponding model parameter that is applicable to only said estimate model. To minimize discrepancies between an aggregate of all estimate models and a corresponding aggregate of all ledger data for corresponding projects, the training unit 150 makes adjustments to values of the model parameters. In one embodiment, the training unit 150 forecasts future cost data for an ongoing project based on the following: either one or more models based on a cost case for the project, or one or more generic models constructed from ledger data by extrapolation.

The predictions storage unit 160 maintains long range cost estimations for one or more planned or ongoing projects.

The reporting storage unit 180 maintains read-only, pre-indexed data for the reporting application 170. The data maintained in the reporting storage unit 180 is extracted from the models storage unit 140 and the predictions storage unit 160. The reporting application 170 comprises a reporting application configured to report forecasting results via an interactive user interface. The reporting application 170 allows for data to be aggregated or filtered in various ways. For example, the reporting application 170 allows filtering by domain (e.g., filtering by business domain) or any grouping of dimensions (e.g., grouping by sector and customer).

Figure 2:
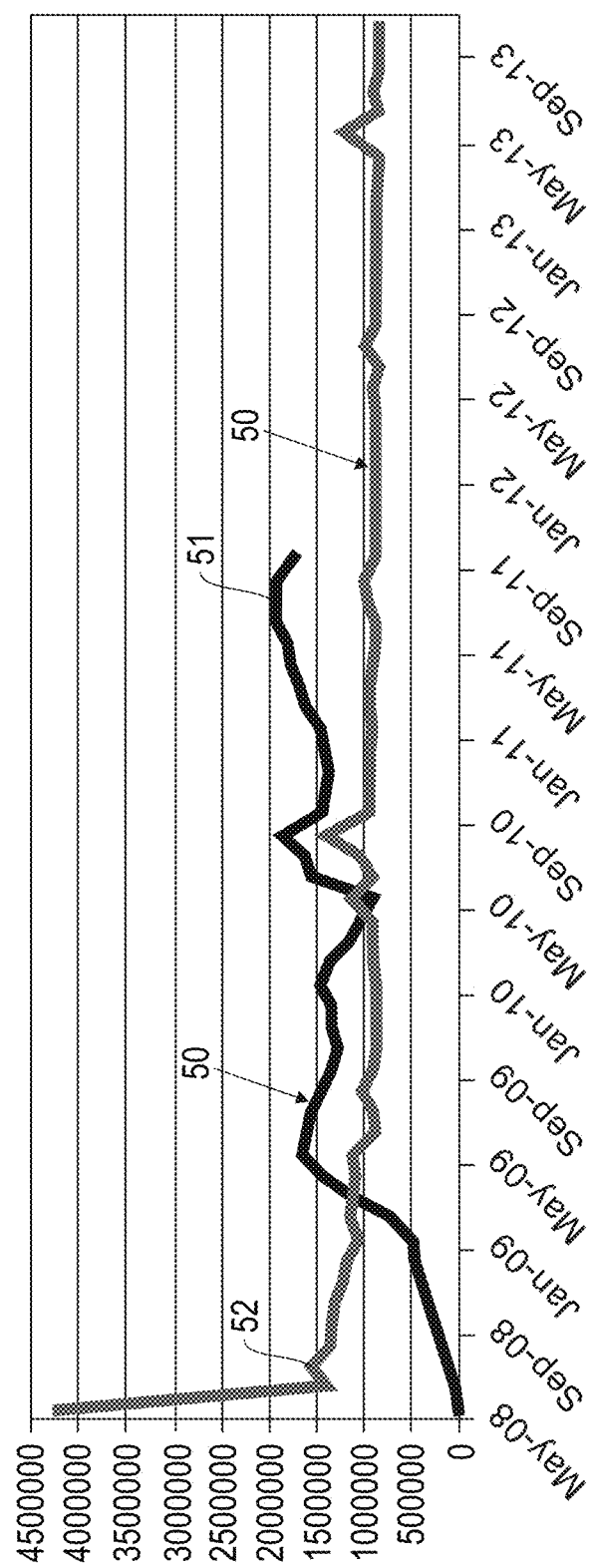
FIG. 2 illustrates two examples of graphs of time series.

FIG. 2 illustrates two examples of graphs of time series 50. Typically, a time series 50 comprises a periodic sequence of values (e.g., costs, profits, revenue) as a function of time. In one embodiment, some of the ledger data maintained in the ledger storage unit 110 may be represented as one or more time series models 50, wherein each time series 50 comprises a sequence of actual costs incurred by an ongoing service delivery project over time (e.g., time series 51 shown in FIG. 2). Similarly, some of the cost cases maintained in the cost cases storage unit 120 may be represented as one or more time series models 50, wherein each time series 50 comprises a sequence of cost estimations for a planned service delivery project over time (e.g., time series 52 shown in FIG. 2).

Figure 3:
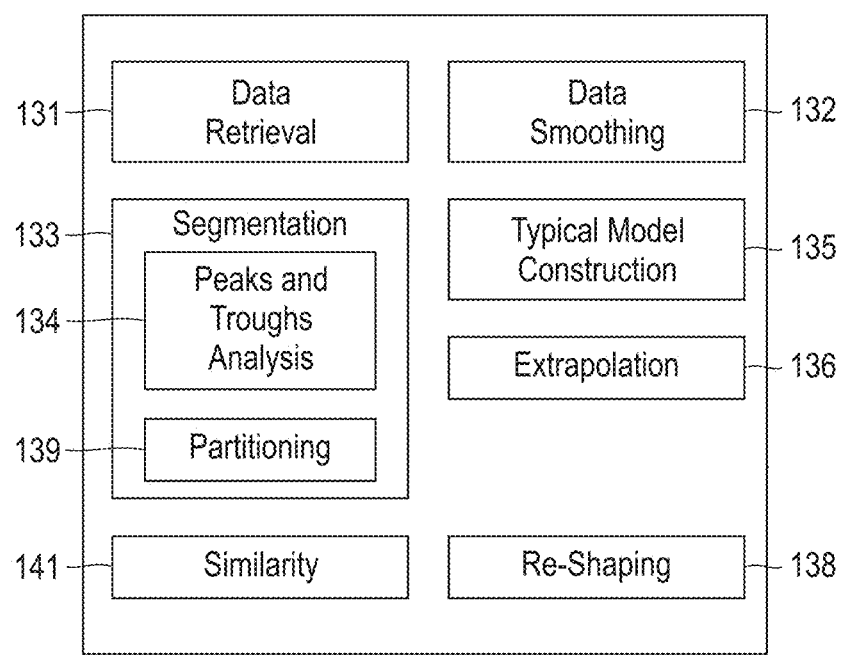
FIG. 3 illustrates an example pre-processing unit, according to an embodiment of the present invention.

FIG. 3 illustrates an example pre-processing unit 130, according to an embodiment of the present invention. The pre-processing unit 130 comprises a data retrieval module 131, a data smoothing module 132, a segmentation module 133, a typical model construction module 135, an extrapolation module 136, a re-shaping module 138, and a similarity module 141.

The data retrieval module 131 is configured to acquire input data from the ledger storage unit 110 and/or the cost cases storage unit 120. As stated above, the pre-processing unit 130 is configured to perform multiple pre-processing operations. Specifically, the data smoothing module 132 is configured to smooth input data to minimize noise. For example, a 3-month simple moving average may be used to smooth input data acquired on a monthly basis. In one embodiment, smoothing of input data may be enabled or disabled.

The typical model construction module 135 is configured to generate (i.e., construct) typical models. The typical model construction module 135 constructs a typical model based on ledger data, such as initial sequences of ledger data experienced during periods where significant changes in accounting practices are minimal. Typical models provide good extrapolations of cost behavior during early volatile cost behavior.

The extrapolation module 136 is configured to extend ledger data into the past and/or into the future. In one example, ledger data are extended into the past in order to enable alignment of the ledger data with a cost case. In another example, a generic model for a project is created by extending ledger data into the future.

The extrapolation module 136 extends ledger data for a project into the past by extending the ledger data to when the project began and before first available ledger data. Specifically, the extrapolation module 136 adds the required number of elements of a scaled version of a typical model to the beginning of the ledger data, wherein a scaling factor that fits the typical model to the ledger data are determined. The extrapolation module 136 extends ledger data for a project into the future by adding a scaled typical model to the end of the ledger data, thereby forming a generic model for the project. If the project is scheduled to run longer than the generic model, the extrapolation module 136 extends the generic model to the scheduled project end date based on a final segment of the generic model.

The re-shaping module 138 is configured to align one or more models based on a cost case to historical ledger data, and reshape cost estimations for the cost case based on actual costs reflected in ledger data.

Some of the pre-processing operations described above may require segmentation of an input time series 50. The segmentation module 133 is configured to generate a segmented model 200 (FIG. 4) for an input time series 50. Specifically, the segmentation module 133 comprises a peaks and troughs analysis module 134 configured for determining peak data values (e.g., peak costs) and trough data values (e.g., trough costs) of the input time series 50. In this specification, a data value denotes an element or a data point of a time series, wherein the data value has a corresponding position in the time series and a corresponding amount. In one embodiment, the peaks and troughs analysis module 134 generates a corresponding indicator array 70 (FIG. 5A) for the input time series 50. The indicator array 70 comprises a corresponding indicator 71 (FIG. 5A) for each data value (i.e., data point) of the input time series 50. A corresponding indicator 71 for a data value of the input time series 50 indicates whether said data value is a peak data value, a trough data value, or neither a peak data value nor a trough data value.

The segmentation module 133 further comprises a partitioning module 139 configured for partitioning the input time series 50 into multiple segments based on the peak data values and trough data values determined, wherein each segment represents a contiguous subsequence of data values. For example, each segment may represent a contiguous subsequence of costs. With the possible exception of a last segment for the input time series 50, each segment ends in either a peak data value or a trough data value. The partitioning module 139 is further configured to generate a succinct approximate representation of the input time series 50 based on the segments of the input time series 50.

In this specification, let the term pre-determined length denote the length of a sequence of neighboring data values.

In one embodiment, a peak data value is a data value that satisfies each of the following conditions: (1) the peak data value is greater than a data value immediately preceding ("immediate predecessor") the peak data value, (2) the peak data value is no less than any data value of a sequence of neighboring data values of a pre-determined length immediately preceding the peak data value, and (3) the peak data value is no less than any data value of a sequence of neighboring data values of a pre-determined length immediately following the peak data value.

In one embodiment, a trough data value is a data value that satisfies each of the following conditions: (1) the trough data value is less than a data value immediately preceding ("immediate predecessor") the trough data value, (2) the trough data value is no greater than any data value of a sequence of neighboring data values of a pre-determined length immediately preceding the trough data value, and (3) the trough data value is no greater than any data value of a sequence of neighboring data values of a pre-determined length immediately following the trough data value.

If data values of an input time series 50 represents costs, a peak data value represents a peak cost and a trough data value represents a trough cost.

In this specification, let x represent an example input time series comprising n data values, such as data values $x[0]$, $x[1]$, . . . , and $x[n-1]$. Let p represent an example peak and trough indicator array for the input time series x, wherein the indicator array p comprises n indicators 71, such as indicators $p[0]$, $p[1]$, . . . , $p[n-1]$. Each indicator $p[i]$ indicates whether a corresponding data value of the input time series x is a peak data value, a trough data value or neither a peak data value nor a trough data value.

In one embodiment, the peaks and troughs analysis module 134 sets each indicator $p[i]$ of the indicator array p to 0, 1, or −1. Specifically, the peaks and troughs analysis module 134 sets an indicator $p[i]$ to 1 if a corresponding data value is a peak. The peaks and troughs analysis module 134 sets an indicator $p[i]$ to −1 if a corresponding element data value is a trough. The peaks and troughs analysis module 134 sets an indicator $p[i]$ to 0 if a corresponding data value is neither a peak nor a trough. The input time series x is partitioned into segments based on the non-zero indicators 71 of the indicator array p.

Table 1 below provides example pseudo code for determining peak data values and trough data values of an input time series x.

TABLE 1

```
//Initialize each entry of the indicator array p to 0
p[0], . . . , p[n−1] = 0;
//Initialize index i to 0
i = 0;
//Initialize variable state to 'begin' state
state = begin;
// Extend each end of input time series x by a subsequence of elements of pre-determined length,
//respectively (e.g., if the pre-determined length is 2, input time series x is concatenated with two
//elements to the left and two elements to the right)
x = x[0], 0 + x + x[n−1], x[n−1];
do {
        //Set index j to the sum of i and a pre-determined length (e.g., 2)
        j = i + 2;
        //Determine if x[j] is a provisional peak by comparing x[j] against the following: a
        //subsequence of data values of pre-determined length immediately preceding x[j], and
        //a subsequence of data values of pre-determined length immediately succeeding x[j]
        if (provisionalPeak(x[j−2], . . . , x[j + 2])) {
                //x[j] is a provisional peak
                //Determine whether previous non-zero indicator p[k] indicates a provisional peak
                if (state == peak) {
                        //If indicator p[k] indicates a provisional peak, set indicator p[k] to 0,
                        //thereby biasing a peak towards the right
                        p[k] = 0;
                }
                //Set variable state to 'peak' to indicate a provisional peak for the
                //most recent segment analyzed
                state = peak;
                //Set indicator p[i] to 1, indicating a provisional peak
                p[i] = 1;
                //Set k to i, wherein k references index of a non-zero indicator of indicator
                //array p
                k = i;
        }
        else {
                //Determine if x[j] is a provisional trough by comparing x[j] against the
                //following: a subsequence of data values of pre-determined length immediately
                //preceding x[j], and a subsequence of data values of pre-determined length
                //immediately succeeding x[j]
                if (provisionalTrough(x[j−2], . . . , x[j+2])) {
                        //x[j] is a provisional trough
                        //Determine whether previous non-zero indicator p[k] indicates a
                        //provisional trough
                        if (state == trough) {
                                //If indicator p[k] indicates a provisional trough, set indicator
                                //p[k] to 0, thereby biasing a trough towards the right
                                p[k] = 0;
                        }
                        //Set variable state to 'trough' to indicate a provisional trough for the
                        //most recent segment analyzed
                        state = trough;
                        //Set indicator p[i] to −1, indicating a provisional trough
                        p[i] = −1;
                        //Set k to i, wherein k references index of a non-zero indicator of indicator
                        //array p
                        k = i;
                }
        }
        //Increment iteration index i
        i = i + 1;
} while (i <= n−1) //repeat loop while iteration index i is less than or equal to n−1
//if iteration index i is greater than n−1, output indicator array p
output p;
```

As shown in Table 1, in one embodiment, the peaks and troughs analysis module 134 iterates through each data value of an input time series 50 to determine whether the data value represents a provisional peak, a provisional trough or neither. Specifically, for each data value, the peaks and troughs analysis module 134 determines whether the data value is a provisional peak or a provisional trough in the context of neighboring data values, such as a first sequence of neighboring data values immediately preceding the data value and a second sequence of neighboring data values immediately following the data value. The first sequence of neighboring data values may have the same number of data values (i.e., the same length) as the second sequence of neighboring data values.

Before the peaks and troughs analysis module 134 iterates through each data value of the input time series 50, the peaks and troughs analysis module 134 may initialize parameters/variables for use during segmentation. For example, the peaks and troughs analysis module 134 may extend each end of the input time series 50 (i.e., the beginning and the end of the input time series 50) by concatenating a sequence of data values of pre-determined length to each end of the input time series 50.

For example, assume an example initial input time series x comprising an array of data values [1, 2, 3, 2, 1, 1]. If the pre-determined length is set to 2, each end of the initial input time series x is concatenated with 2 data values, thereby producing an extended input time series x. For example, a first sequence of data values [1, 0] and a second sequence of data values [1, 1] may be appended to the beginning and the end of the initial input time series x, respectively, to generate the extended input time series x comprising an array of data values [1, 0, 1, 2, 3, 2, 1, 1, 1, 1].

An indicator array p for the input time series x is initialized by setting each entry p[i] of the indicator array p to zero. In this specification, let i denote an iteration index for the indicator array p, wherein i is initialized to zero. Let j denote an iteration index for the extended input time series x, wherein j is initialized to the sum of i and the pre-determined length (i.e., j references the first data value of the initial input time series x). Let state denote a variable that identifies the most recent non-zero indicator p[i], wherein state is initialized to 'begin'.

As the iteration index j is offset by the pre-determined length, an indicator p[i] of the indicator array p corresponds to a data value x[j] of the initial input time series 50. For each iteration of i wherein i is no greater than n−1, the peaks and troughs analysis module 134 determines whether a corresponding data value x[j] for the indicator p[i] is a provisional peak, a provisional trough or neither. Assuming the pre-determined length is 2, the peaks and troughs analysis module 134 determines whether the data value x[j] is a provisional peak or a provisional trough in the context of neighboring data values x[j−2], x[j−1], x[j+1] and x[j+2]. The peaks and troughs analysis module 134 determines that the data value x[j] is a peak data value if the following conditions are satisfied: (1) x[j] is greater than x[j−1], and (2) x[j] is greater than or equal to x[j−2], x[j+1], and x[j+2]. The peaks and troughs analysis module 134 sets an indicator p[i] for the data value x[j] to 1 if the data value x[j] is a provisional peak.

The peaks and troughs analysis module 134 determines that x[j] is a trough cost if the following conditions are satisfied: (1) x[j] is less than x[j−1], and (2) x[j] is less than or equal to x[j−2], x[j+1], and x[j+2]. The peaks and troughs analysis module 134 sets an indicator p[i] for the data value x[j] to −1 if the data value x[j] is a provisional trough. The peaks and troughs analysis module 134 sets an indicator p[i] for the data value x[j] to 0 if the data value x[j] is neither a provisional peak nor a provisional trough.

Assume the peak and troughs analysis module 134 determines peak data values and trough data values of the example input time series x using the example extended input time series x comprising the array of data values [1, 0, 1, 2, 3, 2, 1, 1, 1, 1]. When i is equal to 0 and j is equal to 2, the peaks and troughs analysis module 134 determines whether the data value x[2] is a provisional peak or a provisional trough in the context of neighboring data values x[0], x[1], x[3] and x[4]. x[2] is not a provisional peak because x[2] is less than x[3]. x[2] is also not a provisional trough because x[2] is greater than x[1]. Therefore, a corresponding indicator p[0] is set to 0, indicating that x[2] is neither a peak nor a trough.

When i is equal to 1 and j is equal to 3, the peaks and troughs analysis module 134 determines whether the data value x[3] is a provisional peak or a provisional trough in the context of neighboring data values x[1], x[2], x[4] and x[5]. x[3] is not a provisional peak because x[3] is less than x[4]. x[3] is also not a provisional trough because x[3] is greater than x[2]. Therefore, a corresponding indicator p[1] is set to 0, indicating that x[3] is neither a peak nor a trough.

When i is equal to 2 and j is equal to 4, the peaks and troughs analysis module 134 determines whether the data value x[4] is a provisional peak or a provisional trough in the context of neighboring data values x[2], x[3], x[5] and x[6]. x[4] is a provisional peak because x[4] is greater than x[2], x[3], x[5] and x[6]. Therefore, p[2] is set to 1, indicating that x[4] is a provisional peak.

When i is equal to 3 and j is equal to 5, the peaks and troughs analysis module 134 determines whether the data value x[5] is a provisional peak or a provisional trough in the context of neighboring data values x[3], x[4], x[6] and x[7]. x[5] is less than x[4] but greater than x[6]. Therefore, p[3] is set to 0, indicating that x[5] is neither a peak nor a trough.

When i is equal to 4 and j is equal to 6, the peaks and troughs analysis module 134 determines whether the data value x[6] is a provisional peak or a provisional trough in the context of neighboring data values x[4], x[5], x[7] and x[8]. x[6] is a provisional trough because x[6] is less than or equal to x[4], x[7] and x[8], and x[6] is less than x[5]. Therefore, p[4] is set to −1, indicating that x[6] is a provisional trough.

When i is equal to 5 and j is equal to 7, the peaks and troughs analysis module 134 determines whether the data value x[7] is a provisional peak or a provisional trough in the context of neighboring data values x[5], x[6], x[8] and x[9]. x[7] is equal to x[6] and x[8]. Therefore, p[5] is set to 0, indicating that x[7] is neither a peak nor a trough.

The resulting indicator array p for the example initial input time series x comprises an array of indicators [0, 0, 1, 0, −1, 0].

The peaks and troughs analysis module 134 is further configured to concatenate (i.e., merge) consecutive (i.e., adjacent) segments that rise (i.e., each consecutive segment ends in a peak data value) and concatenate consecutive segments that fall (i.e., each consecutive segment ends in a trough data value). Therefore, the segmentation module 133 produces a sequence of segments of alternating character (i.e., an alternating rise and fall character).

For example, if a first segment ending in a peak data value is consecutively followed by a second segment ending in a peak data value (i.e., the first and second segments are adjacent rising segments), the first and second segments are concatenated into one segment having a peak/rise character. Specifically, a corresponding indicator 71 for the first segment is set to 0, thereby biasing a peak data value towards the right.

As another example, if a first segment ending in a trough data value is consecutively followed by a second segment ending in a trough data value (i.e., the first and second segments are adjacent falling segments), the first and the second segments are concatenated into one segment having a trough/fall character. Specifically, a corresponding indicator 71 for the first segment is set to 0, thereby biasing a trough data value towards the right.

The partitioning module 139 partitions an input time series 50 into segments based on the non-zero indicators 71 of a corresponding indicator array 70. For example, as the resulting indicator array p for the example initial input time series x comprises the array of indicators [0, 0, 1, 0, −1, 0], no concatenation/merging is needed for the indicator array p (i.e., there are no consecutive segments that fall/rise). A segmented model 200 for the example initial input time series x comprises three segments: a first segment comprising the data values x[0], x[1] and x[2] of the example initial input time series x (i.e., 1, 2, 3), a second segment comprising the data values x[3] and x[4] of the example initial input time series x (i.e., 2, 1), and a third segment comprising the data value x[5] of the example initial input time series x (i.e., 1).

The segmentation of an input time series 50 is a fast computation. The segmentation is converted into a sequence of totals, wherein each total corresponds to a segment, and wherein each total represents a sum of data values of a corresponding segment. The sequence of totals provides a succinct approximate representation of the input time series 50 that captures milestones, independent of timing.

The partitioning module 139 is further configured to generate a succinct approximate representation for an input time series 50 based on a corresponding segmented model 200 for the input time series 50. Specifically, for each segment of a corresponding segmented model 200 for an input time series 50, the partitioning module 139 computes a total equal to the sum of data values included in said segment. For example, the totals for the first segment, the second segment, and the third segment of the example initial input time series x are 6, 3, and 1, respectively. Therefore, the sequence of totals 6, 3, 1 represent a succinct approximate representation of the example initial input time series x.

In one embodiment, the partitioning module 139 provides a segment table 75 (FIG. 5B) for the segmented model 200, wherein each entry of the segment table 75 comprises segment information for a corresponding segment. Segment information for a segment may include a total representing a combined sum of data values included in the segment, a length of the segment, and a character of the segment.

In one embodiment, the peak data values and trough data values identified represent milestones in a service delivery project. Relevant patterns of costs are represented as ratios between total costs of various segments. Even if timing durations vary in unpredictable ways, a ratio of total costs between a trough and peak to total costs between a subsequent trough and peak has small variance among similar projects or parts of projects (i.e., a total cost for a milestone is predictable).

In one embodiment, each peak data value of an input series 50 is no less than at least three other data values of the input series 50. Specifically, each peak data value is greater than a data value immediately preceding the peak data value in the input series 50. Each peak data of the input series 50 further satisfies the following conditions: (1) the peak data value is no less than each data value of a first subsequence of data values, and (2) the peak data value is no less than each data value of a second subsequence of data values. In one example implementation, the first subsequence of data values comprises at least two data values immediately preceding the peak data value in the input series 50, and the second subsequence of data values comprises at least one data value immediately following the peak data value in the input series 50. In another example implementation, the first subsequence of data values comprises at least one data value immediately preceding the peak data value in the input series 50, and the second subsequence of data values comprises at least two data values immediately following the peak data value in the input series 50.

In one embodiment, each trough data value of an input series 50 is no greater than at least three other data values of the input series 50. Specifically, each trough data value is less than a data value immediately preceding the trough data value in the input series 50. Each trough data of the input series 50 further satisfies the following conditions: (1) the trough data value is no greater than each data value of a first subsequence of data values, and (2) the trough data value is no greater than each data value of a second subsequence of data values. In one example implementation, the first subsequence of data values comprises at least two data values immediately preceding the trough data value in the input series 50, and the second subsequence of data values comprises at least one data value immediately following the trough data value in the input series 50. In another example implementation, the first subsequence of data values comprises at least one data value immediately preceding the trough data value in the input series 50, and the second subsequence of data values comprises at least two data values immediately following the trough data value in the input series 50.

In one embodiment, the segmentation module 133 further comprises a similarity module 141 configured for determining whether a first service delivery project is similar to a second service delivery project. Specifically, the similarity module 141 utilizes the segmentation module 133 to generate a first segmented model 200 (i.e., a first sequence of segments that rise and fall alternately) for a first input series 50 comprising a sequence of costs over time for the first service delivery project. The similarity module 141 further utilizes the segmentation module 133 to generate a second segmented model 200 (i.e., a second sequence of segments that rise and fall alternately) for a second input series 50 comprising a sequence of costs over time for the second service delivery project. For each segmented model 200, the similarity module 141 determines a corresponding length for said segmented model 200. The similarity module 141 further determines a correlation coefficient between the first segmented model 200 and the second segmented model 200. The similarity module 141 determines that the first service delivery project is similar to the second service delivery project when the first segmented model 200 and the second segmented model 200 have the same length, and the correlation coefficient between the first segmented model 200 and the second segmented model 200 exceeds a pre-determined threshold.

Figure 4:
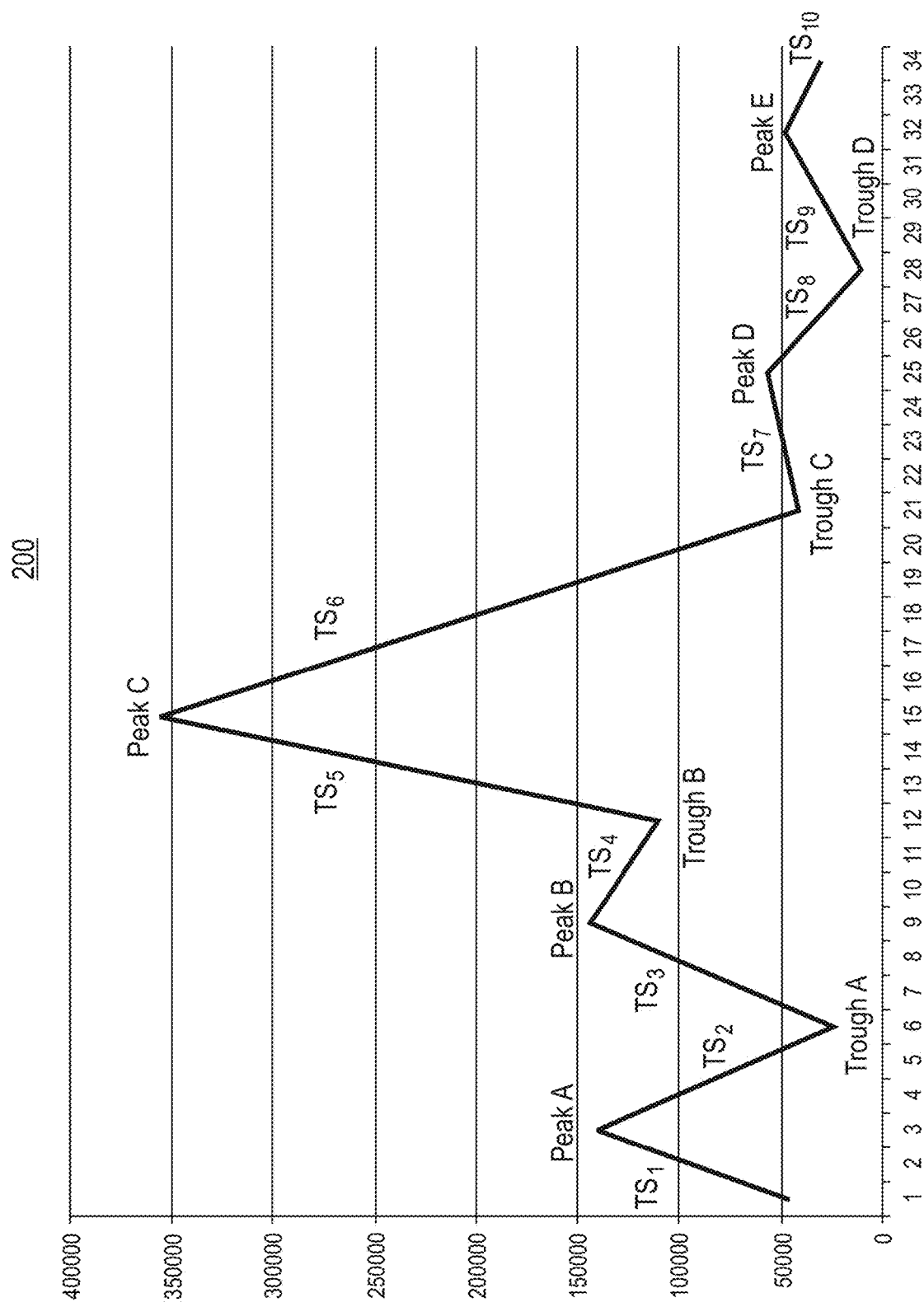
FIG. 4 illustrates an example segmented model, according to an embodiment of the present invention.

FIG. 4 illustrates an example segmented model 200, according to an embodiment of the present invention. A segmented model 200 provides alternating patterns for identifying similar processes. Specifically, the segmented model 200 comprises a sequence of segments of alternating character, such as a first segment $TS_1$ having a peak/rise character, a second segment $TS_2$ having a trough/fall character, a third segment $TS_3$ having a peak/rise character, a fourth segment $TS_4$ having a trough/fall character, a fifth segment $TS_5$ having a peak/rise character, a sixth segment $TS_6$ having a trough/fall character, a seventh segment $TS_7$ having a peak/rise character, an eighth segment $TS_8$ having a trough/fall character, a ninth segment $TS_9$ having a peak/rise character, and a tenth segment $TS_{10}$ having a trough/fall character.

With the possible exception of a last segment, each segment of the segmented model 200 ends in either a peak cost or a trough cost. As shown in FIG. 4, the first segment $TS_1$ ends at a first peak cost Peak A, the second segment $TS_2$ ends at a first trough cost Trough A, the third segment $TS_3$ ends at a second peak cost Peak B, the fourth segment $TS_4$ ends at a second trough cost Trough B, the fifth segment $TS_5$ ends at a third peak cost Peak C, the sixth segment $TS_6$ ends at a third trough cost Trough C, the seventh segment $TS_7$ ends at a fourth peak cost Peak D, the eighth segment $TS_8$ ends at a fourth trough cost Trough D, and the ninth segment $TS_9$ ends at a fifth peak cost Peak E.

FIG. 5A illustrates an example peak and trough indicator array 70 for an example input time series 50, according to an embodiment of the present invention. Assume an input time series 50 comprises n data values. A corresponding indicator array 70 for the input time series 50 comprises n indicators 71. Each indicator 71 indicates whether a corresponding data value of the input time series 50 is a peak, trough or neither a peak nor a trough.

For example, as described above, the example initial input time series x comprising the sequence of data values [1, 2, 3, 2, 1, 1] has a corresponding indicator array 70 comprising the sequence of indicators [0, 0, 1, 0, −1, 0]. FIG. 5A illustrates the indicator array 70 for the example initial input time series x. As shown in FIG. 5A, indicator p[2] corresponding to data value x[2] indicates that data value x[2] is a peak data value. Indicator p[4] corresponding to data value x[4] indicates that data value x[4] is a trough data value.

FIG. 5B illustrates an example segment table 75 for an example input time series 50, according to an embodiment of the present invention. As described above, partitioning of an input time series 50 into segments of alternating character is based on non-zero indicators of a corresponding indicator array 70.

For example, as described above, the example initial input time series x comprising the sequence of data values [1, 2, 3, 2, 1, 1] has a corresponding indicator array 70 comprising the sequence of indicators [0, 0, 1, 0, −1, 0]. Therefore, the partitioning of the example initial input time series x into segments of alternating character is based on non-zero indicators p[2] and p[4] of the corresponding indicator array 70.

Specifically, a segmented model 200 for the example initial input time series x comprises three segments: a first segment comprising data values x[0], x[1] and x[2], a second segment comprising data values x[3] and x[4], and a third segment comprising data value x[5]. FIG. 5B illustrates a segment table 75 maintaining segment information for each segment of the example initial input time series x.

As shown in FIG. 5B, segment information for a segment may include a total representing a combined sum of data values included in the segment, a length of the segment, and a character of the segment. For example, the first segment has a total equal to 6 (i.e., the sum of x[0], x[1] and x[2]), a length equal to 3 (i.e., the first segment includes only 3 data values), and a peak/rise character (because p[2] indicates that x[2] is a peak data value). The second segment has a total equal to 3 (i.e., the sum of x[3] and x[4]), a length equal to 2 (i.e., the second segment includes only 2 data values), and a trough/fall character (because p[4] indicates that x[4] is a trough data value). The third segment has a total equal to 1 (i.e., x[5]), a length equal to 1 (i.e., the third segment includes only 1 data value), and neither a peak/rise character nor a trough/fall character (because p[5] indicates that x[5] is neither a peak data value nor a trough data value).

The totals for the first segment, the second segment, and the third segment (i.e., 6, 3, and 1) provide a succinct approximate representation of the example initial input time series x.

Figure 6A:
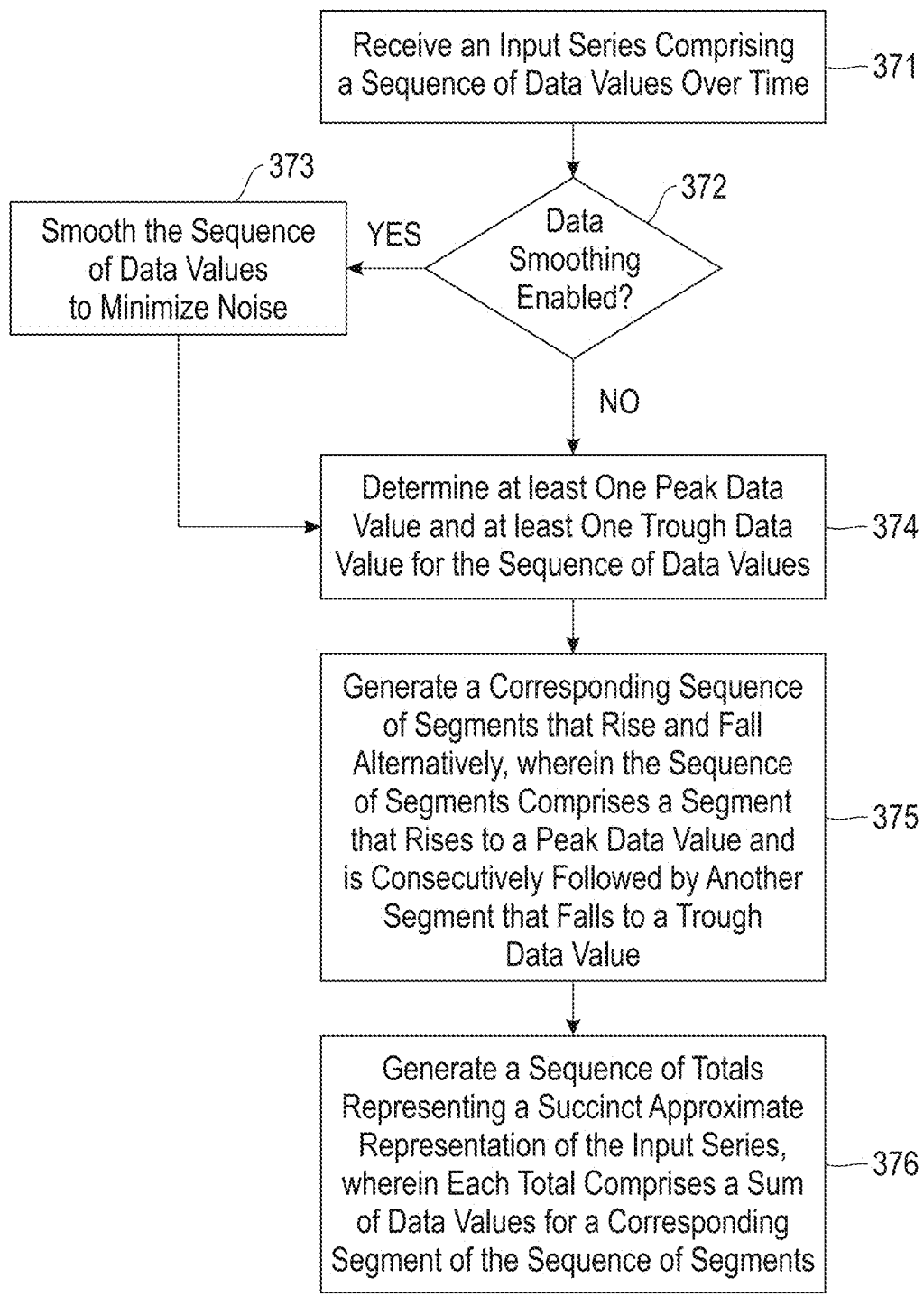
FIG. 6A illustrates a flowchart of an example process for generating a sequence of segments that rise and fall alternatively for a sequence of data values, according to an embodiment of the present invention.

FIG. 6A illustrates a flowchart of an example process 370 for generating a sequence of segments that rise and fall alternately for a sequence of data values, according to an embodiment of the present invention. In process block 371, receive an input series comprising a sequence of data values over time. In process block 372, determine whether data smoothing is enabled. If data smoothing is not enabled, proceed to process block 374. If data smoothing is enabled, proceed to process block 373 where the sequence of data values is smoothed to minimize noise. After the sequence of data values is smoothed, proceed to process block 374.

In process block 374, determine at least one peak data value and at least one trough data value for the sequence of data values. An embodiment of the function performed by process block 374 is described further above in relation to FIG. 3 and in particular in relation to peaks and troughs analysis module 134. In process block 375, generate a corresponding sequence of segments that rise and fall alternately, wherein the sequence of segments comprises a segment that rises to a peak data value and is consecutively followed by another segment that falls to a trough data value. In process block 376, generate a sequence of totals representing a succinct approximate representation of the input series, wherein each total comprises a sum of data values for a corresponding segment of the sequence of segments. An embodiment of the functions performed by process blocks 375 and 376 is described further above in relation to FIG. 3 and in particular in relation to partitioning module 139.

Figure 6B:
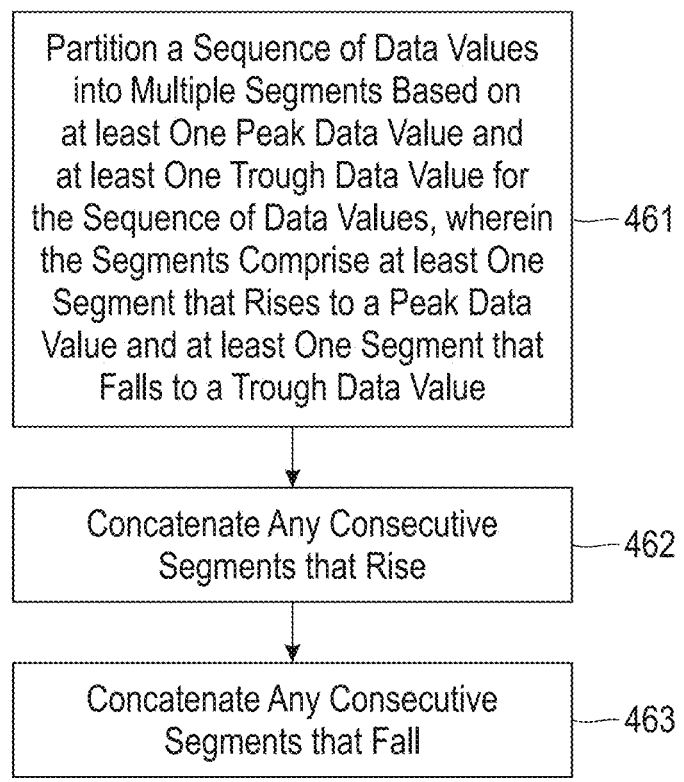
FIG. 6B illustrates a flowchart of an example process for generating a sequence of segments that rise and fall alternatively for a sequence of data values, according to an embodiment of the present invention.

FIG. 6B illustrates a flowchart of an example process 460 for generating a sequence of segments that rise and fall alternately for a sequence of data values, according to an embodiment of the present invention. In process block 461, partition a sequence of data values into multiple segments based on at least one peak data value and at least one trough data value for the sequence of data values, wherein the segments comprise at least one segment that rises to a peak data value and at least one segment that falls to a trough data value. In process block 462, concatenate any consecutive segments that rise. In process block 463, concatenate any consecutive segments that fall. An embodiment of the functions performed by process blocks 461, 462 and 463 is described further above in relation to FIG. 3 and in particular in relation to segmentation module 133.

FIG. 6C illustrates a flowchart of an example process 476 for generating a succinct approximate representative for an input series, according to an embodiment of the present invention. In process block 477, partition a sequence of cost values over time for a service delivery project into multiple segments, wherein each segment comprises a contiguous subsequence of the sequence of cost values, and wherein the segments comprise at least one of a segment that rises to a peak cost value of the sequence of cost values and a segment that falls to a trough cost value of the sequence of cost values. In process block 478, generate a sequence of segments that rise and fall alternately based on the segments, wherein the sequence of segments comprises a segment that rises to a peak cost value and is consecutively followed by another segment that falls to a trough cost value. In process block 479, based on the sequence of segments, generate a corresponding sequence of total cost values representing a succinct approximate representation of the sequence of cost values, wherein each total cost value comprises a sum of cost values for a corresponding segment of the sequence of segments. An embodiment of the functions performed by process blocks 477, 478 and 479 is described further above in relation to FIG. 3 and in particular in relation to similarity module 141.

Figure 6D:
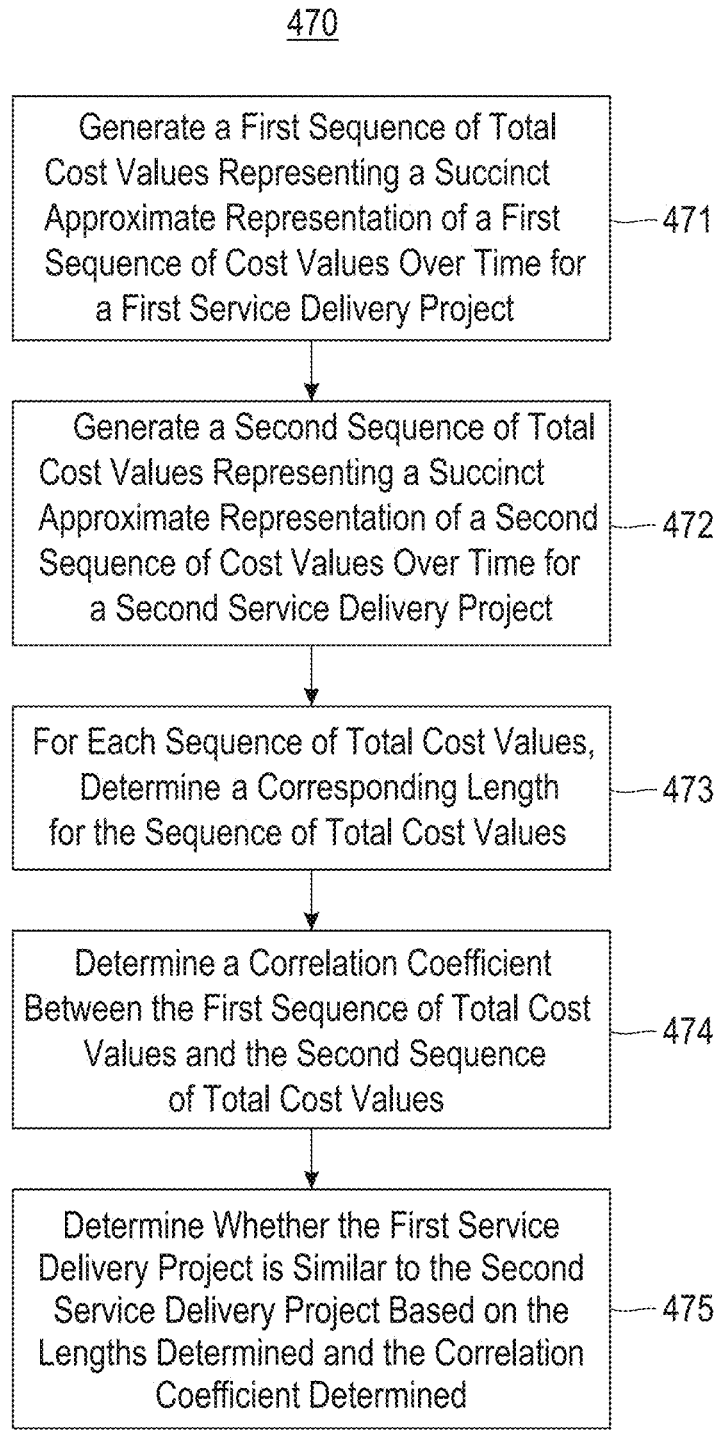
FIG. 6D illustrates a flowchart of an example process for determining whether a first service delivery project is similar to a second service delivery project, according to an embodiment of the present invention.

FIG. 6D illustrates a flowchart of an example process 470 for determining whether a first service delivery project is similar to a second service delivery project, according to an embodiment of the present invention. In process block 471, generate a first sequence of total costs values representing a succinct approximate representation of a first sequence of cost values over time for a first service delivery project. In process block 472, generate a second sequence of total costs values representing a succinct approximate representation of a second sequence of cost values over time for a second service delivery project. In process block 473, determine a corresponding length for each sequence of total cost values. In process block 474, determine a correlation coefficient between the first sequence of total cost values and the second sequence of total cost values. In process block 475, determine whether the first service delivery project is similar to the second service delivery project based on the lengths determined and the correlation coefficient determined. An embodiment of the functions performed by process blocks 471, 472, 473, 474 and 475 is described further above in relation to FIG. 3 and in particular in relation to similarity module 141.

Figure 7A:
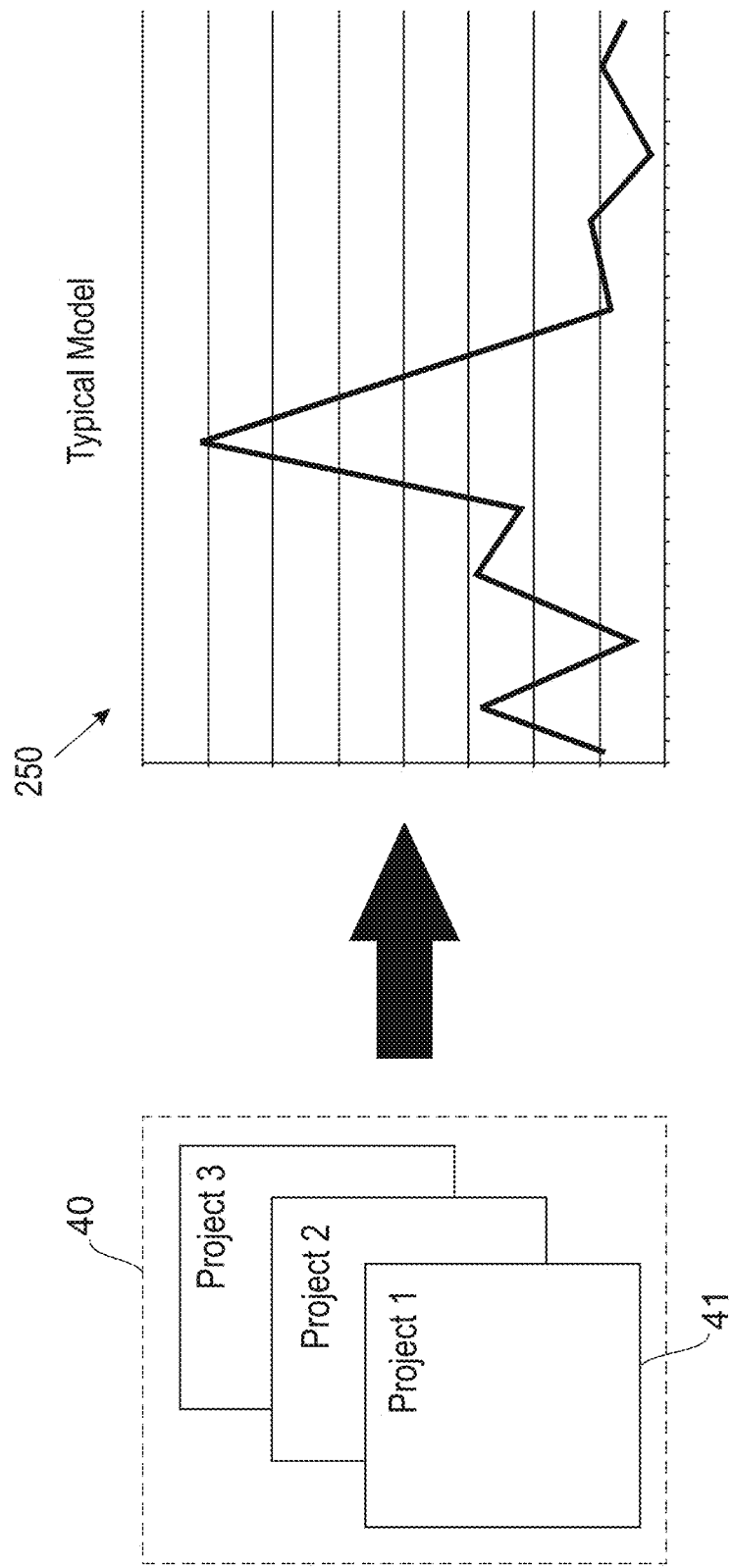
FIG. 7A illustrates generating an example typical model based on a set of projects, according to an embodiment of the present invention.

FIG. 7A illustrates generating an example typical model 250 based on a set 40 of projects 41, according to an embodiment of the present invention. A typical model 250 is a segmented model 200 representing an aggregate of multiple segmented models 200.

The construction module 135 is configured to generate (i.e., construct) a typical model 250 based on a set 40 of projects 41. Each project 41 comprises a sequence of data values (e.g., costs). For example, the construction module 135 may be used to construct a typical model of work patterns based on a set 40 of service delivery projects 41 obtained from the ledger storage unit 110 or the cost cases storage unit 120. The construction module 135 is also configured to construct a typical model 250 based on a set 40 of parts of projects 41.

Table 2 below provides example pseudo code for constructing a typical model 250 based on segmented models 200 for a set 40 of projects 41.

length (i.e., duration of time) for the segment based on a corresponding segment of all segmented models 200 for the set 40. Each segment of the typical model 250 has a corresponding slope, wherein the corresponding slope is equal to an average total cost computed for the segment divided by a length based on the average length computed for the segment.

With the possible exception of a last segment, each segment of the typical model 250 ends in a data value that is equal to a sum of a prior end value for a prior segment and a product of the slope and a length based on the average length. If a segment is a bad segment because it violates prespecified constraints based on ratios between the segments of the segmented model 200, the length of a prior segment and the length of the bad segment are adjusted to maintain the pre-specified constraints.

In one embodiment, a segment may be a bad segment if the segment includes non-positive data values. A segment may also be a bad segment if a ratio of peak to trough for the segment and a preceding/prior segment exceeds a maximum corresponding peak to trough ratio for all segmented models 200 for the set 40.

Figure 7B:
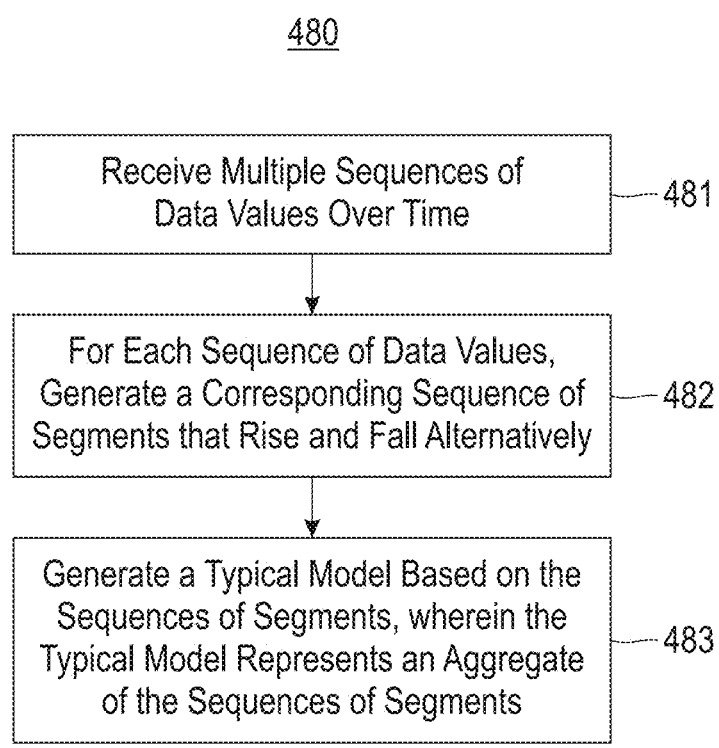
FIG. 7B illustrates a flowchart of an example process for generating a typical model, according to an embodiment of the present invention.

FIG. 7B illustrates a flowchart of an example process 480 for generating a typical model, according to an embodiment of the present invention. In process block 481, receive multiple sequences of data values over time. In process block 482, generate a corresponding sequence of segments that rise and fall alternatively for each sequence of data values. In process block 483, generate a typical model based on the sequences of segments, wherein the typical model

TABLE 2

```
//Compute average cost and average length for each segment of typical model, wherein y
//represents number of segments that typical model will have; TotalCost₁, TotalCost₂, . . .,
//TotalCost_z represent total costs for a first segmented model, a second segmented model, . . .,
//and a final segmented model for the set of projects; length₁, length₂, . . ., length_z represent
//lengths for a first segmented model, a second segmented model, . . ., and a final segmented
//model for the set of projects
for (s = 1; s <= y; s++) {
        average_cost[s] = computeAverage(TotalCost₁[s], TotalCost₂[s], . . ., TotalCost_z[s]);
        average_length[s] = computeAverage(length₁[s], length₂[s], . . ., length_z[s]);
        average_length[s] = roundToNearestInteger(average_length[s]);
}
//Set index s to 1
s = 1;
while (1) {
        //Compute slope and end value of each segment of typical model
        slope[s] = average_cost[s]/average_length[s];
        end_value[s] = end_value[s-1] + (slope[s]*average_length[s]);
        if (badSegment([s])) {
            //If current segment is bad, adjust length of prior and current segment
            //based on constraints
            adjustLength(s-1,s);
        }
        if (badSegment([s])) {
            //If current segment is still bad, output s - 1 segments
            output s-1 segments;
            break;
        }
        else {
            //Increment index s
            s = s+1;
        }
}
```

As shown in Table 2, in one embodiment, for each project 41 of the set 40, the construction module 135 utilizes the segmentation module 133 to convert the sequence of data values of the project 41 into a segmented model 200 comprising a sequence of segments of alternating character. For each segment of the typical model 250, the construction unit 135 computes an average total cost and an average represents an aggregate of the sequences of segments. An embodiment of the function performed by process block 483 is described further above in relation to FIG. 7A and in particular in relation to typical model construction module 135.

Figure 7C:
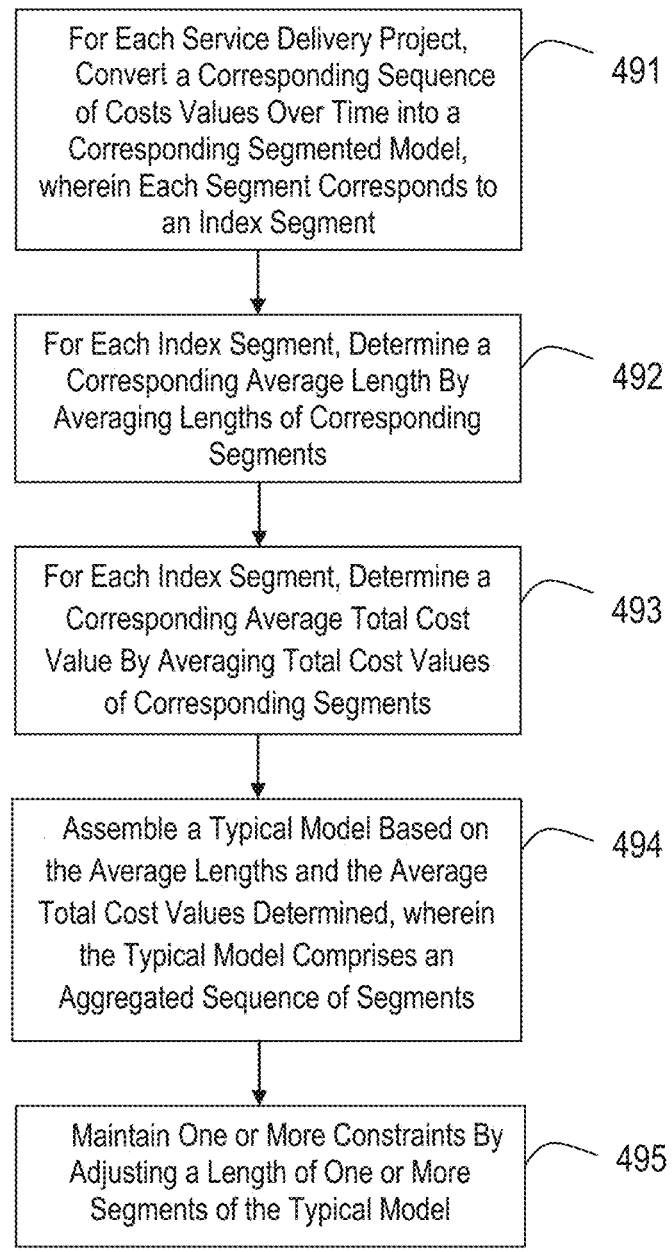
FIG. 7C illustrates a flowchart of an example process for constructing a typical model for one or more work patterns of a set of service delivery projects, according to an embodiment of the present invention.

FIG. 7C illustrates a flowchart of an example process 490 for constructing a typical model for one or more work patterns of a set of service delivery projects, according to an embodiment of the present invention. In process block 491, for each service delivery project, converting a corresponding sequence of cost values over time into a corresponding segmented model, wherein each segmented model comprises a sequence of segments that rise and fall alternately, and wherein each segment of each sequence of segments corresponds to an index segment indicating a position of the segment in the sequence of segments. In process block 492, for each index segment, determine a corresponding average length by averaging lengths of corresponding segments. The average length determined is rounded to the nearest integer. In process block 493, for each index segment, determine a corresponding average total cost value by averaging total cost values of corresponding segments. In process block 494, assemble a typical model based on the average lengths and the average total cost values determined, wherein the typical model comprises an aggregated sequence of segments. In process block 495, maintain one or more constraints by adjusting a length of one or more segments of the typical model. An embodiment of the functions performed by process blocks 491, 492, 493, 494 and 495 is described further above in relation to FIG. 7A and in particular in relation to typical model construction module 135.

Figure 8A:
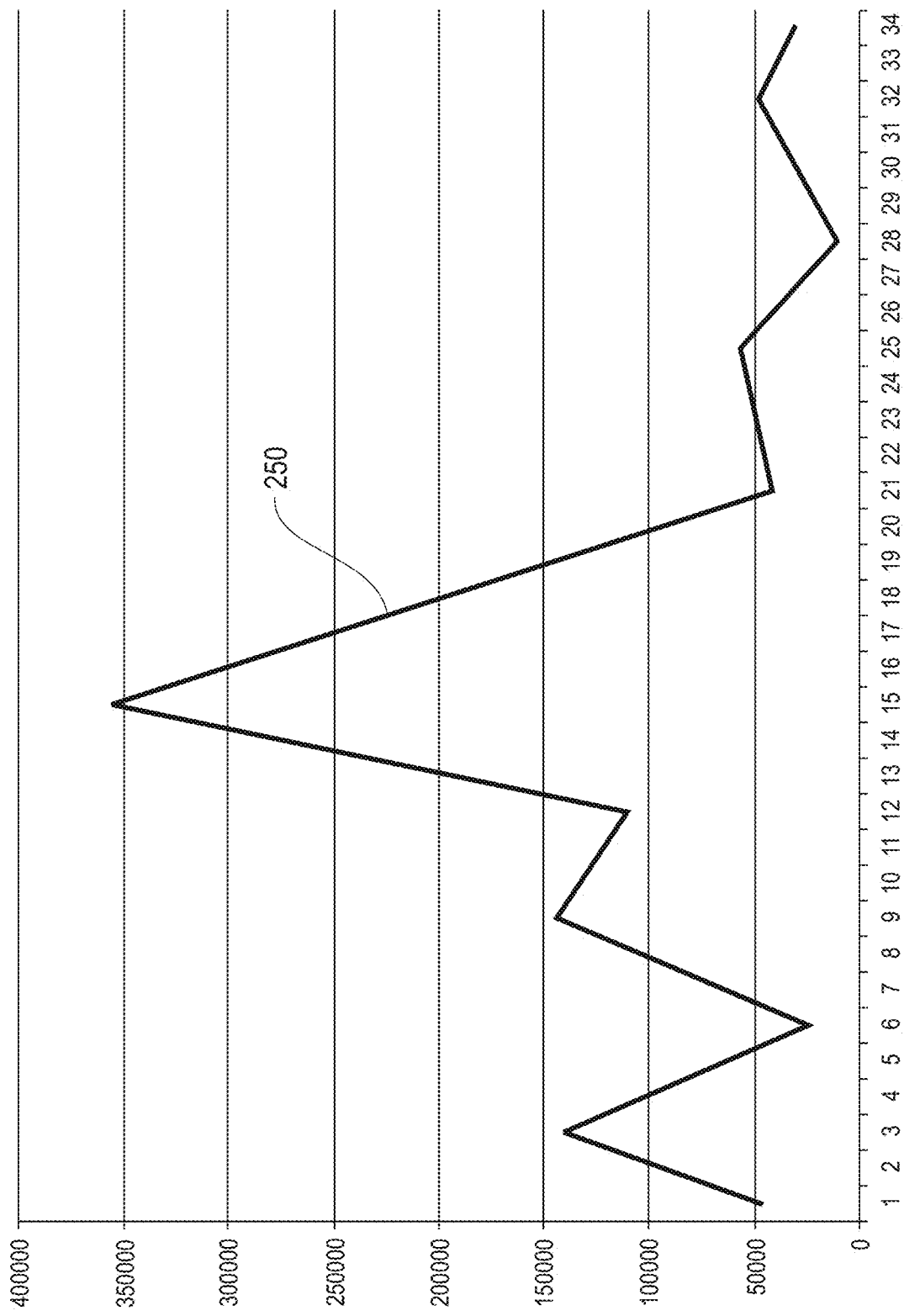
FIG. 8A illustrates an example typical model, according to an embodiment of the present invention.

FIG. 8A illustrates an example typical model 250, according to an embodiment of the present invention. As stated above, a typical model 250 is a segmented model 200 representing an aggregate of multiple segmented models 200.

Figure 8B:
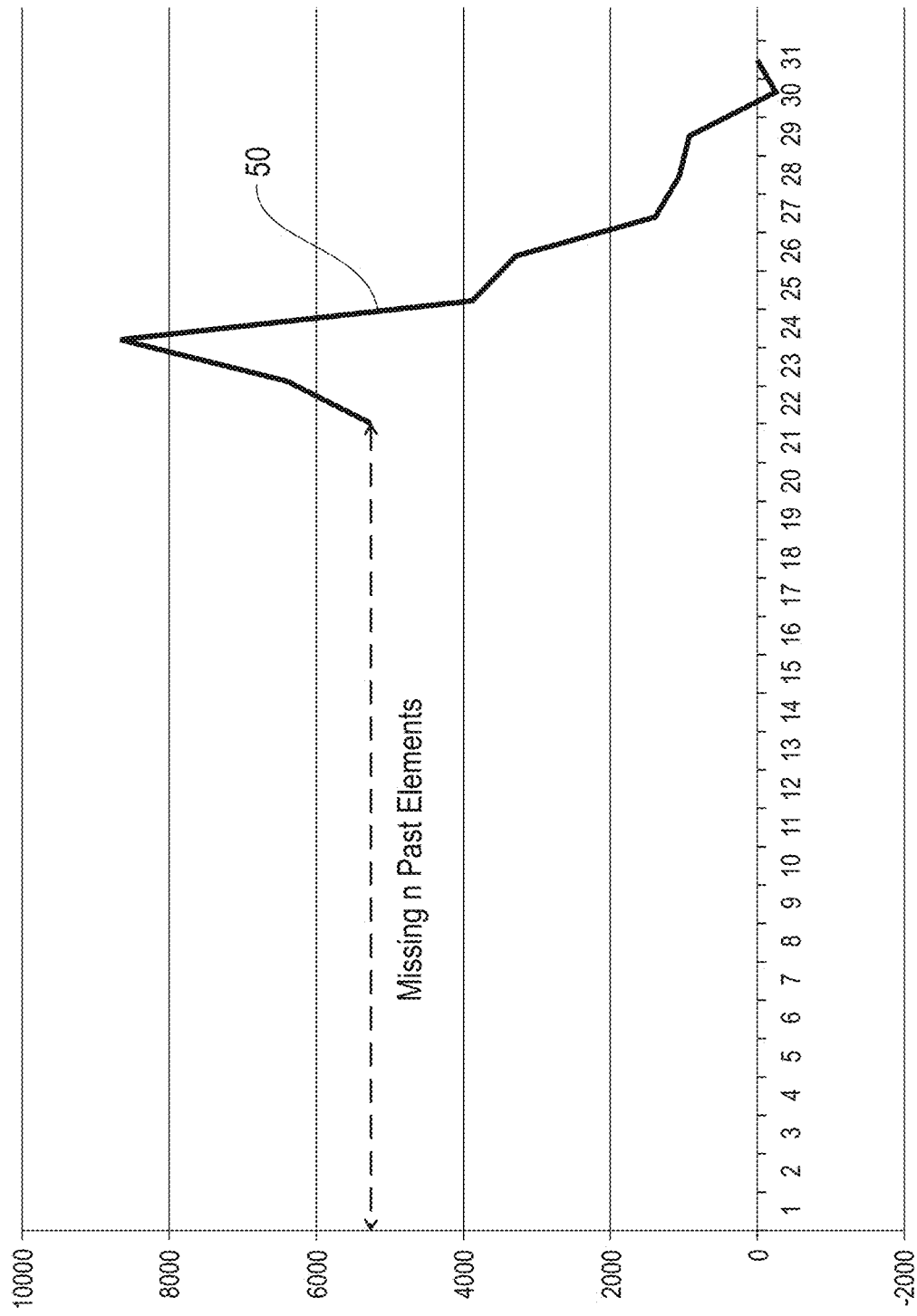
FIG. 8B illustrates an example input time series missing one or more past data values, according to an embodiment of the present invention.

FIG. 8B illustrates an example input time series 50 missing one or more past data values, according to an embodiment of the present invention. The number of missing past data values (i.e., elements) may be n, wherein n is a positive integer. A missing past data value may represent missing past cost data. For example, as shown in FIG. 8B, the input time series 50 has about n missing past data values.

The extrapolation module 136 is configured to extrapolate the missing past data values of the time series 50 based on a typical model 250. In one embodiment, the extrapolation module 136 utilizes the construction module 135 to generate a typical model 250, such as the typical model 250 shown in FIG. 8A. Upon receiving the input time series 50, the extrapolation module 136 utilizes the segmentation module 133 to generate a segmented model 200 for the input time series 50. The extrapolation module 136 is then configured to fit the typical model 250 to the segmented model 200. Specifically, the extrapolation module 136 aligns a peak or trough of the segmented model 200 with a first corresponding peak or trough of the typical model 250, wherein the point of alignment is after the number of missing past data values. The extrapolation module 136 then extends the input time series 50 into the past by concatenating at least a portion of a scaled version of the typical model 250 with at least a portion of the segmented model 200 to extrapolate the missing past data values.

In one embodiment, the typical model 250 is scaled based on a scaling factor equal to a ratio between a data value of the input time series 50 and a data value of the aligned typical model 250 at the point of alignment.

In one embodiment, models must satisfy a constraint requiring the first segment of each model to be a rising segment. The constraint requiring the first segment of each model to be a rising segment facilitates aligning of models, but results in hidden troughs. In this specification, a hidden trough of a model denotes a trough that occurs before a first peak data value of the model but is not designated as a trough to satisfy the constraint requiring the first segment of each model to be a rising segment. If models must satisfy a constraint requiring the first segment of each model to be a rising segment, the extrapolation module 136 aligns a peak or a hidden trough of the segmented model 200 with a first corresponding peak or trough of the typical model 250, wherein the point of alignment is after the number of missing past data values.

Table 3 below provides example pseudo code for determining whether a segmented model x has a hidden trough. If a pre-determined length is not specified, it is assumed that two neighboring elements immediately preceding an element of an input time series 50 and two neighboring elements immediately following the element are required to determine whether the element is a provisional peak or a provisional trough.

TABLE 3

```
if (isPeak(x[0])) {
        //If first element of segmented model x is a peak, there
        is no hidden trough
        output "no hidden trough";
}
else {
        //Determine maximum h of segmented model x, extend x to
        left by two copies
        //of h+1, and perform segmentation of extended segmented
        model x
        h = max(x);
        extend x to left by two copies of h+1;
        segment(x);
        if (isPeak(x[0])) {
            //If first element of extended segmented model x is a peak,
            index of hidden
            //trough is equal to index of first trough − 2
            output index of first trough − 2;
        }
        else {
            //There is no hidden trough
            Output "no hidden trough";
        }
}
```

Figure 9:
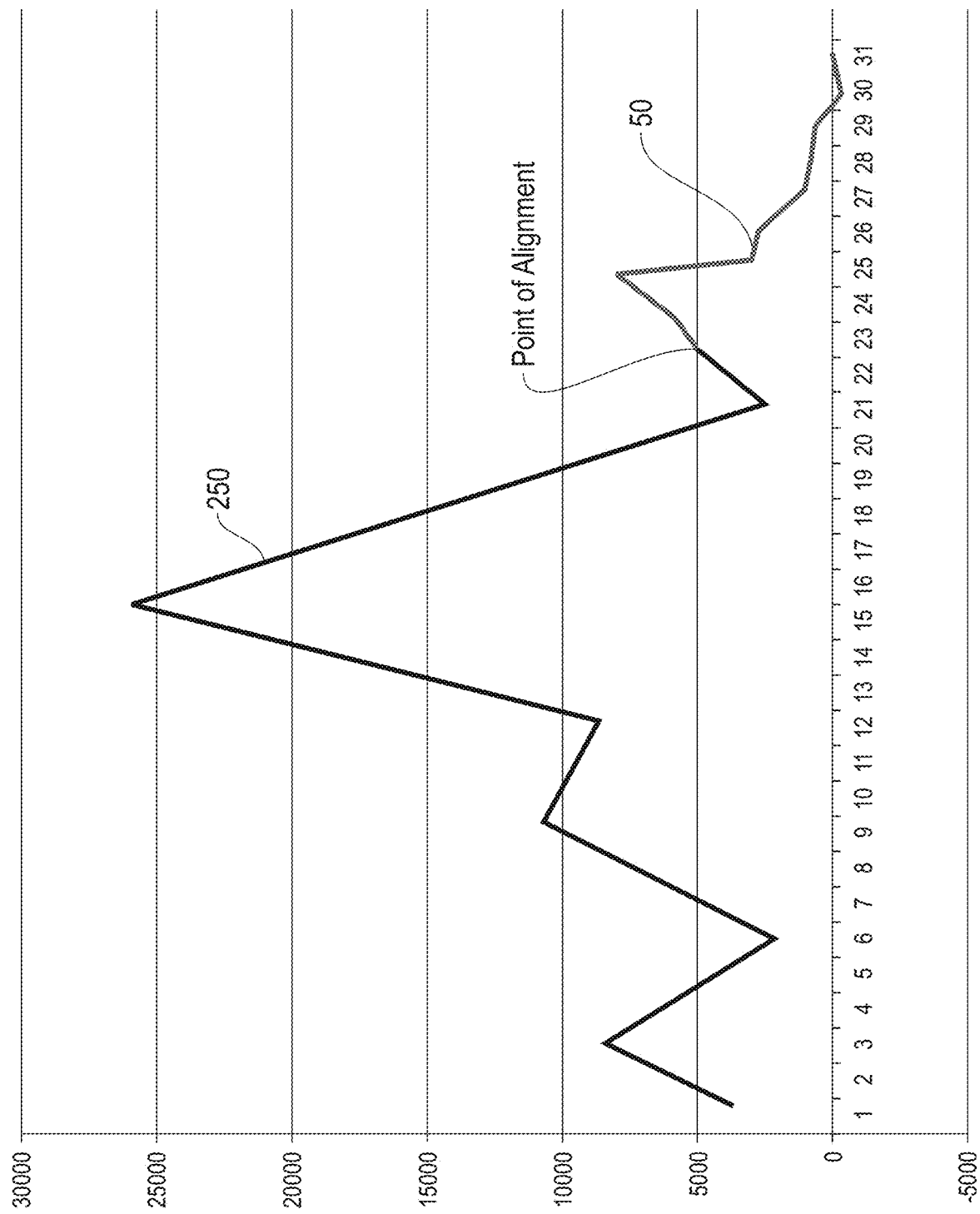
FIG. 9 illustrates the example input time series in FIG. 8B concatenated with a scaled typical model to extrapolate missing data values, according to an embodiment of the present invention.

FIG. 9 illustrates the example input time series 50 in FIG. 8B concatenated with a scaled typical model 250 to extrapolate missing past data values, according to an embodiment of the present invention. To extrapolate the missing past data values, the extrapolation module 136 extends the input time series 50 into the past by concatenating at least a portion of a scaled version of the typical model 250 with at least a portion of the input time series 50 to extrapolate the missing past data values. The point of alignment between the typical model 250 and the input time series 50 is after at least the number of missing past data values.

Figure 10:
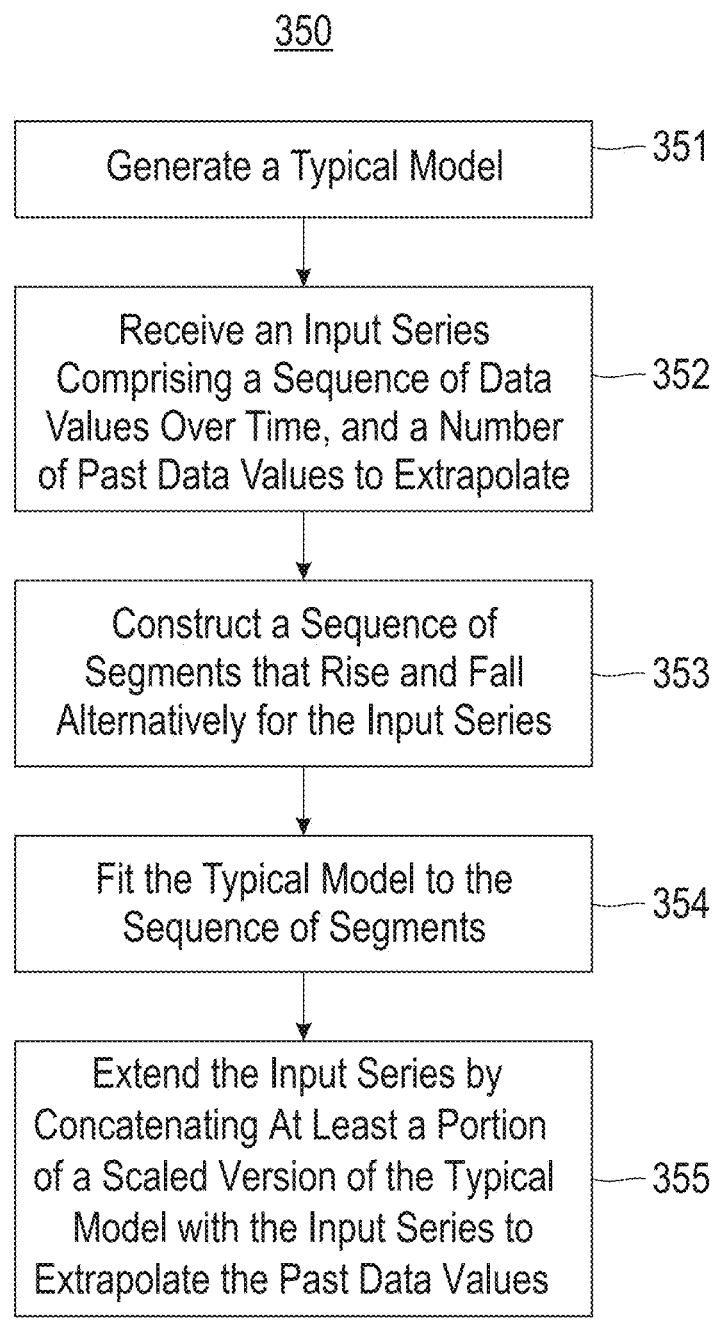
FIG. 10 illustrates a flowchart of an example process for extrapolating missing past data values for an input series, according to an embodiment of the present invention.

FIG. 10 illustrates a flowchart of an example process 350 for extrapolating missing past data values for an input series, according to an embodiment of the present invention. In process block 351, generate a typical model. In process block 352, receive an input series comprising a sequence of data values over time, and a number of past data values to extrapolate. In process block 353, construct a sequence of segments that rise and fall alternatively for the input series. In process block 354, fit the typical model to the sequence of segments. For example, the typical model is fitted to the sequence of segments by aligning a peak of the typical model to a peak of the sequence of segments (the point of alignment). As another example, the typical model is fitted to the sequence of segments by aligning a trough of the typical model to a hidden trough of the sequence of segments (the point of alignment). In process block 355, extend the input series by concatenating at least a portion of a scaled version of the typical model with the input series to extrapolate the past data values. An embodiment of the functions performed by process blocks 354 and 355 are described further above in relation to FIGS. 8-9 and in particular in relation to extrapolation module 136.

Figure 11:
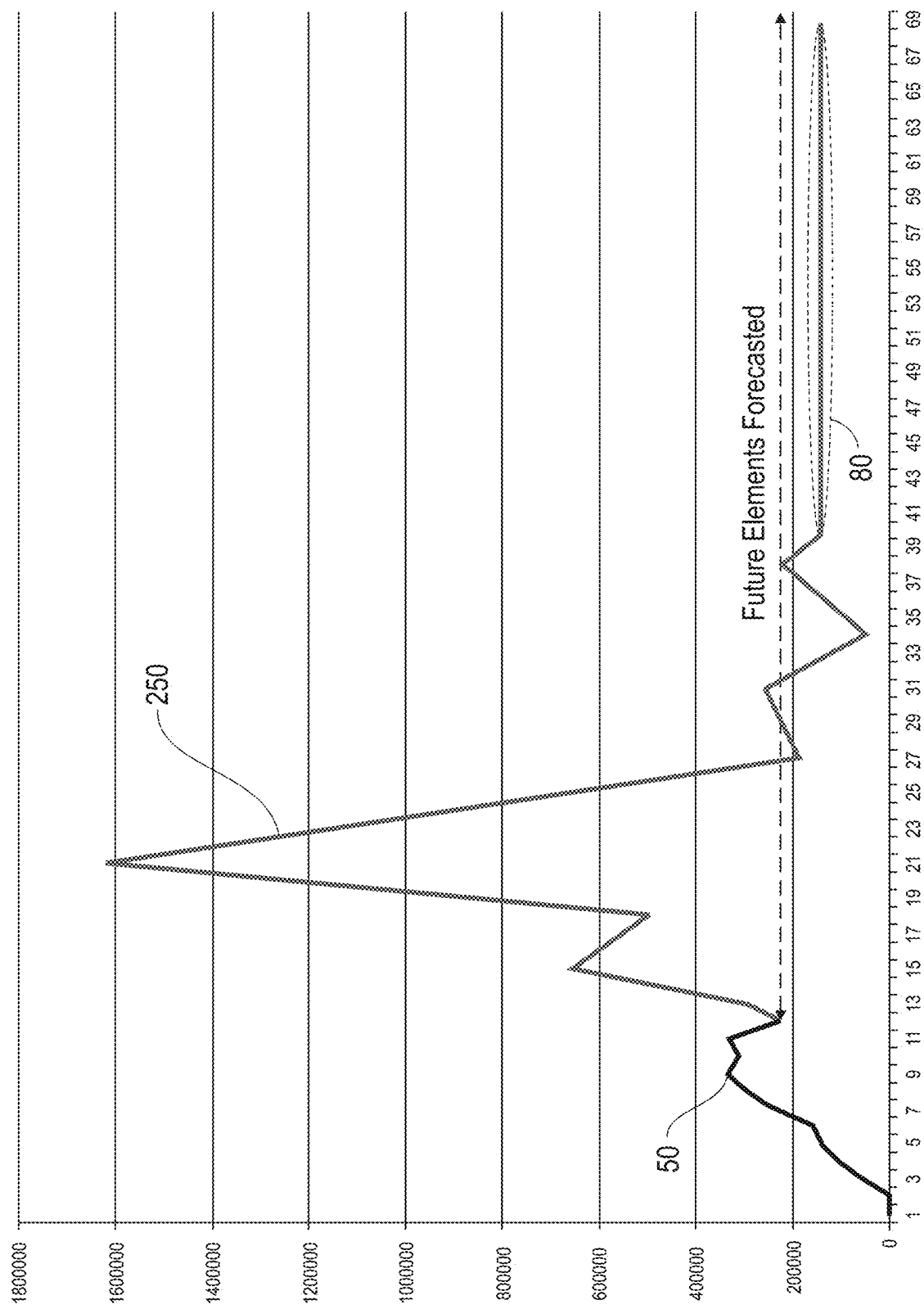
FIG. 11 illustrates an example input time series concatenated with a scaled typical model to forecast future data values, according to an embodiment of the present invention.

FIG. 11 illustrates an example input time series 50 concatenated with at least a portion of a scaled typical model 250 to forecast future data values, according to an embodiment of the present invention. A future data value may represent future cost data. The extrapolation module 136 is configured to forecast future data values based on a typical model 250.

In one embodiment, the extrapolation module 136 utilizes the construction module 135 to generate a typical model 250, such as the typical model 250 shown in FIG. 11. Upon receiving an input time series 50 and a number of future data values to forecast for the input time series 50, the extrapolation module 136 utilizes the segmentation module 133 to generate a segmented model 200 for the input time series 50. The extrapolation module 136 completes a last segment of the segmented model 200 such that the last segment ends in either a peak or a trough. The extrapolation module 136 then fits the typical model 250 to the segmented model 200. Specifically, the extrapolation module 136 aligns the last segment of the segmented model 200 with a peak or hidden trough of the typical model 250, wherein the point of alignment is after the number of segments of the segmented model 200. The extrapolation module 136 then extends the input time series 50 into the future by concatenating at least a portion of a scaled version of the typical model 250 with the input time series 50 to forecast the future data values. For example, as shown in FIG. 11, the scaled version of the typical model 250 is concatenated with the input time series 50 after the last segment of the segmented model 200.

Table 4 below provides example pseudo code for completing a last segment of a segmented model y.

TABLE 4

```
//Index last references last element of segmented model y
last = length of y - 1;
if (isPeak(y[last]) or isTrough(y[last])) {
        //If element y[last] is a peak or a trough, output segmented model y
        output y;
}
else if ((y[0] == 0) and (y[1] == 0) and ... (y[last] == 0)) {
        //If all values of segmented model y are equal to zero, set y[last] to 0.01 and
        //output segmented model y
        y[last] = 0.01;
        output y;
} else if (last == 0) {
        //If index last equals zero, output x[0], 0, -x[0]
        output x[0], 0, -x[0];
} else {
        //Set z to length of maximum final subsequence without peaks or troughs
        z = length of y[last]
        if (y[last-z] ==NULL) {
                //If segment y[last-z] does not exist, assume y[last-z] is equal to zero
                y[last-z] = 0;
        }
        //Set wa to exponentially weighted average of final z differences (i.e., y[last]-y[last-1],
        //y[last-1]-y[last-2], . . . , y[last-z-1]-y[last-z]
        wa = exponentially weighted average of final z differences;
        if (wa == 0) {
                //If wa is equal to zero, set wa to last difference (i.e., y[last]-y[last-1])
                wa = last difference;
        }
        if (wa == 0) {
                //If wa is equal to zero, set wa to 0.1 and extend y by y[last]+wa, y[last]+2wa
                wa = 0.1;
                extend y by y[last]+wa, y[last]+2wa;
        //Modify y until y[last+2] > 0.0
        while (y[last+2] <= 0) {
                if ((y[last] <=0 ) and (wa < 0)) {
                        //If y[last] is less than or equal to zero and wa is less than zero,
                        //set wa to -wa
                        wa = -wa;
                }
                if ((y[last]+wa) < 0) {
                        //If y[last]+wa is less than zero, extend y by 0 and -y[last]-wa
                        extend y by 0 and -y[last]-wa;
                }
                else if ((y[last]+2wa) < 0) {
                        //If y[last]+2wa is less than zero, extend y by y[last]+wa, (y[last]+wa)/2
                        extend y by y[last]+wa, (y[last]+wa)/2;
                }
                else if ((y[last]+2wa) == 0) {
                        //If y[last]+2wa equals to zero, extend y by y[last]+wa, abs(y[last])
                        extend y by y[last]+wa, abs(y[last]);
                }
        }
        output y;
}
```

If a project is scheduled to run longer than the resulting concatenated model, the extrapolation module 136 extends the concatenated model to a scheduled end date for the project based on a final segment of the concatenated model. In one embodiment, the extrapolation module 136 builds a ramp 80 from a scaled last data value of the typical model 250, wherein the ramp 80 accounts for a total obtained by multiplying the scaled last data value by the number of elements to forecast. For example, as shown in FIG. 11, an example ramp 80 extends to the right of the typical model 250.

Table 5 below provides example pseudo code for building a ramp for a segmented model y, wherein the segmented model y is concatenated with a version of typical model j that is scaled by a scaling factor r to account for n future elements.

TABLE 5

```
//Index last references last element of typical model j
last = length(j) − 1;
if (length(j) > length (y)) {
    //If typical model j has more elements than segmented
    model y, extend
    //segmented model y to right by n copies of j[last] scaled
    by scaling factor r
    m = j[last] * r;
    extend y to right by n copies of m;
}
else {
    //If typical model j has less than or the same number of
    elements as time
    //segmented model y, extend segmented model y to
    right by n elements
    total = n*j[last]*r;
    slope = 2*(total − (n*x[last]))/(n*(n+1));
    for (i =1; i <=n; i++) {
        extend y to right by y[last]+(i*slope);
    }
}
output extended y;
```

Figure 12:
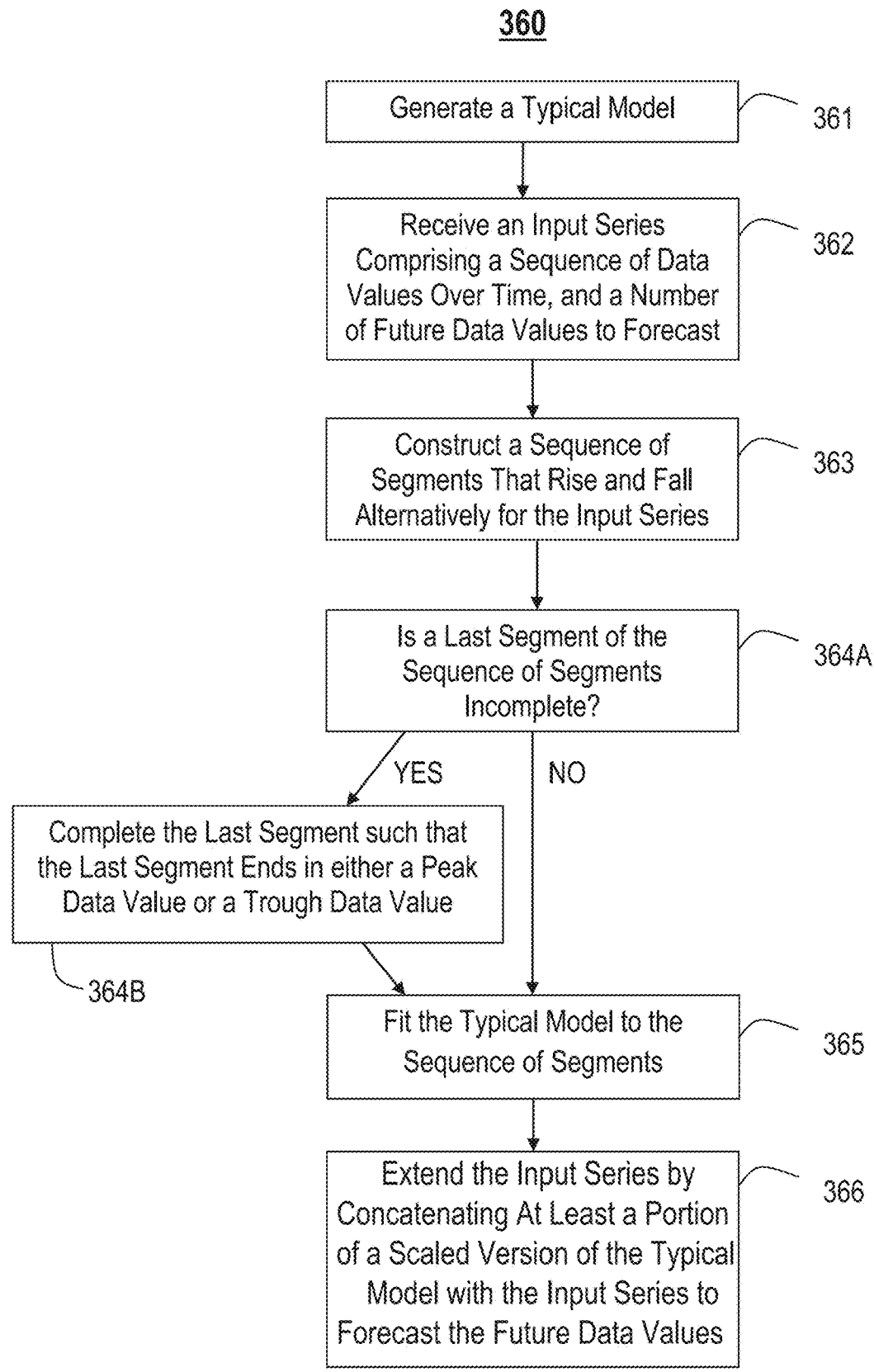
FIG. 12 illustrates a flowchart of an example process for forecasting future data values for an input series, according to an embodiment of the present invention.

FIG. 12 illustrates a flowchart of an example process 360 for forecasting future data value for an input series, according to an embodiment of the present invention. In process block 361, generate a typical model. In process block 362, receive an input series comprising a sequence of data values over time, and a number of future data values to forecast. In process block 363, construct a sequence of segments that rise and fall alternatively for the input series. In process block 364A, determine if a last segment of the sequence of segments is incomplete. If the last segment is incomplete, proceed to process block 364B. If the last segment is complete, proceed to process block 365.

In process block 364B, complete the last segment such that the last segment ends in either a peak data value or a trough data value, and proceed to process block 365. In process block 365, fit the typical model to the sequence of segments. In process block 366, extend the input series by concatenating at least a portion of a scaled version of the typical model with the input series to forecast the future data values. An embodiment of the functions performed by process blocks 364A, 364B, 365 and 366 are described further above in relation to FIG. 11 and in particular in relation to extrapolation module 136.

In another embodiment, a typical model 250 may be used as a source for regression forecasting of an input time series 50. For example, the typical model 250 and the input time series 50 may be aligned for one or more missing data elements. A model such as a best fit linear model between the typical model 250 and the input time series 50 may be applied to the typical model 250 to provide estimates for missing past or future data elements.

Figure 13:
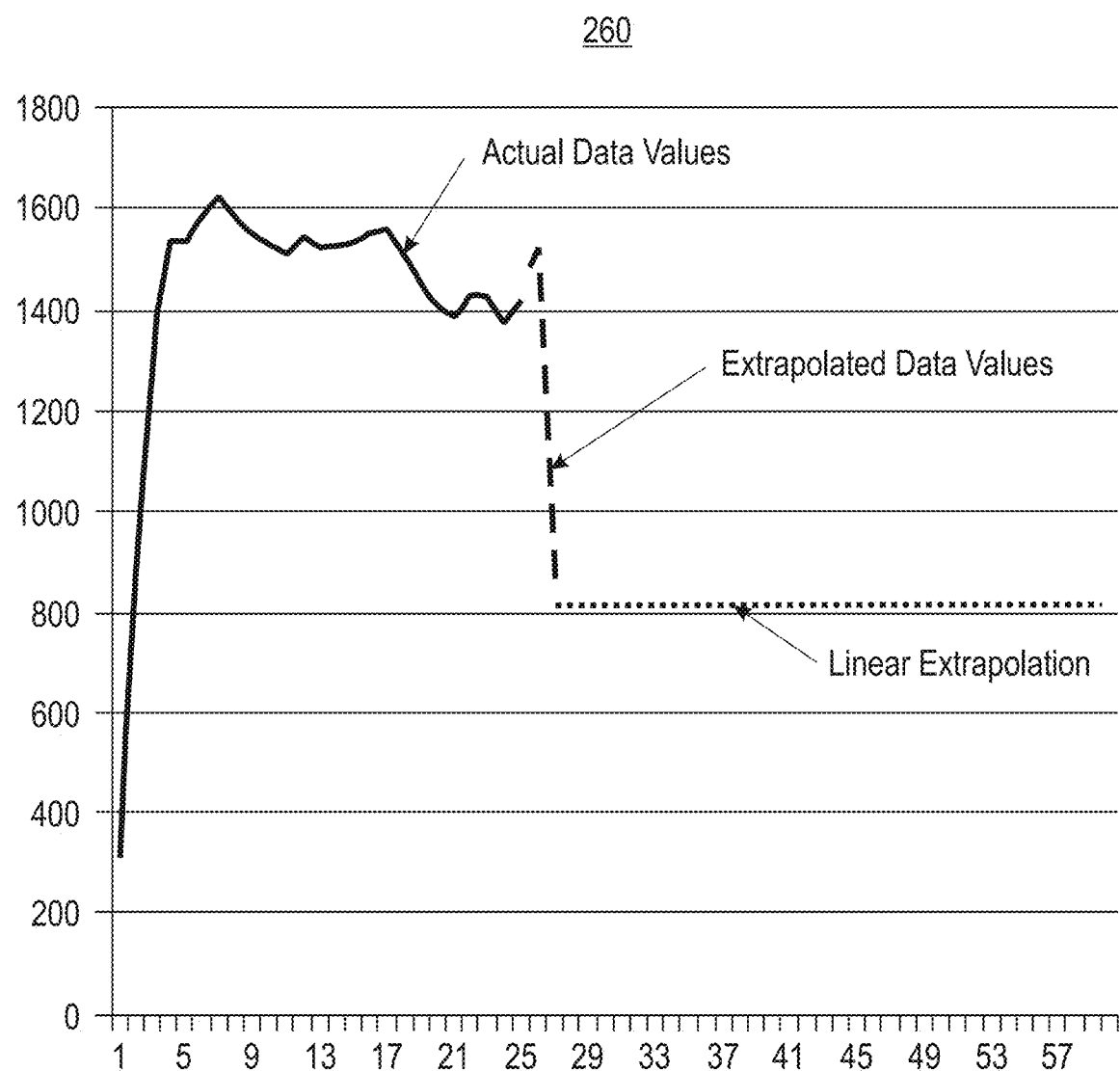
FIG. 13 illustrates an example generic model, according to an embodiment of the present invention.

FIG. 13 illustrates an example generic model 260, according to an embodiment of the present invention. When a cost case for a project is missing or fails to match corresponding ledger data for the project (i.e., an unusable cost case), a generic model 260 is constructed based on ledger data for the project and ledger data for similar projects.

Specifically, the system 100 utilizes the construction module 135 to construct a typical model 250 based on ledger data for similar projects. The system 100 then utilizes the extrapolation module 136 to extend available ledger data for the project using the typical model 250.

For example, as shown in FIG. 13, a generic model 260 comprises a first sequence of data values representing actual data values (e.g., actual costs recorded in ledger data), a second sequence of data values that were extrapolated using a typical model 250, and a third sequence of data values that were linearly extrapolated (e.g., by building a ramp from a scaled last data value of the typical model 250).

Figure 14:
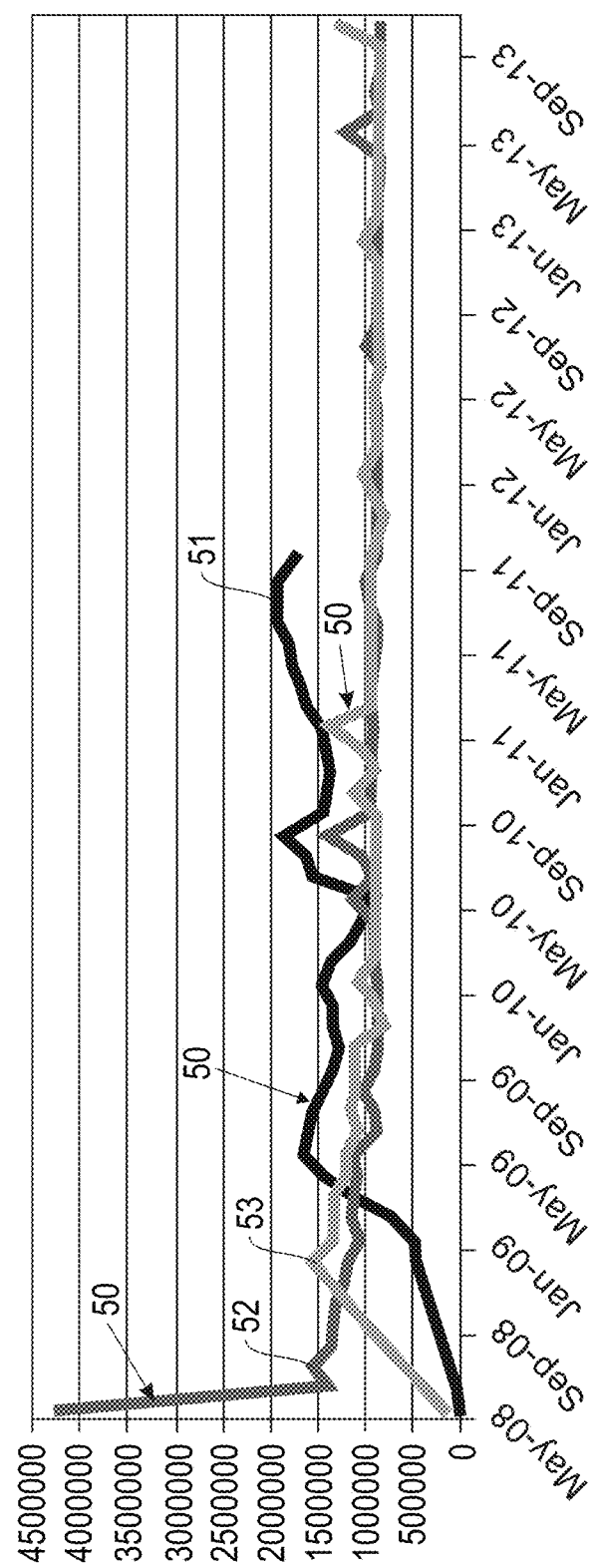
FIG. 14 illustrates multiple example time series including a re-shaped time series, according to an embodiment of the present invention.

FIG. 14 illustrates multiple example time series 50 including a re-shaped time series 53, according to an embodiment of the present invention. Specifically, FIG. 14 illustrates a first time series 51 representing a sequence of actual data values (e.g., actual costs incurred by an ongoing service delivery project over time), a second time series 52 representing a sequence of estimated data values (e.g., cost estimations for a planned service delivery project over time), and third time series 53 representing a sequence of re-shaped estimated data values (e.g., re-shaped cost estimations for a planned service delivery project over time).

In one embodiment, the re-shaping module 138 is configured to align and re-shape a sequence of estimated data values for a project based on actual data for the project and/or actual data for similar projects. For example, the re-shaping module 138 may be used to align a cost case (or corresponding generic model) to historical ledger data, and re-shape cost estimations for the cost case based on actual costs reflected in ledger data.

In this specification, let A denote an input time series 50 representing a sequence of actual data values for a project, and let P denote an input time series 50 representing a sequence of estimated data values for a plan for the same project. To align and re-shape the input time series P, the re-shaping module 138 utilizes the segmentation module 133 to generate a segmented model 200 for the input time series A and a segmented model 200 for the input time series P.

The re-shaping module 138 also utilizes the construction module 135 to generate a typical model 250 based on actual data for similar projects. If the input time series A has missing past data values, the re-shaping module 138 utilizes the extrapolation module 136 to extrapolate the missing past data values. Specifically, a scaled version of at least a portion of the typical model 250 is concatenated to the input time series A to extrapolate the missing past data values.

The re-shaping module 138 aligns at least one segment of the segmented model 200 for the input time series A with a corresponding segment of the segmented model 200 for the input time series P. The input time series P is then re-shaped to fit the aligned segments of the segmented model 200 for the input time series A. In one embodiment, the aligned segments of the segmented model 200 for the input time series A are scaled to preserve total estimated data values. For example, the aligned segments of the segmented model 200 for the input time series A are scaled based on a ratio between total estimated data values and total actual data values. In one embodiment, the re-shaped time series may be extended to correspond to an end date for the project.

For example, when all historical ledger data are available for a project, the re-shaping module 138 may be used to align a cost case for the project to earliest actual costs. The aligned cost case is then re-shaped to fit the shape of the ledger data, while preserving total planned costs instead of total ledger costs.

Table 6 below provides example pseudo code for aligning and re-shaping a segmented model for an input time series P using a segmented model for an input time series A.

TABLE 6

```
//Initialize start segment index for segmented model for a plan P
aP =0;
//Initialize start segment index for segmented model for actuals A
aA = 0;
//Initialize end segment index for segmented model for P
sP = aP+1;
//Initialize end segment index for segmented model for A
sA = aA + 1;
while (1) {
        //Determine if feasible to replace segments aP through sP with scaled segments aA
        //through sA
        if (feasible(aA,sP,aA,sA)) {
            //If feasible...
            replace segments from aP, . . ., sP with scaled segments aA, . . ., sA and maintain
            timing data (i.e., dates) for A;
            aP = sP;
            aA = sA;
            sP = aP+1;
            sA = aA + 1;
        }
        else {
            //If not feasible...
            //lastA references last segment of segmented model for A
            lastA = segment index of A[length(A) − 1];
            //lastP references last segment of segmented model for P
            lastP = segment index of P[length(P) − 1];
            if (sA < lastA) {
                    sA = sA + 1;
            }
            else if (sP < lastP) {
                    sP = sP + 1;
                    sA = sA + 1;
            }
            else {
                    output revised P with adjusted dates;
                    break;
            }
        }
}
```

In one embodiment, it is feasible to replace one or more segments for the input time series P with one or more corresponding segments for the input time series A if replacing the segments preserves the alternating character of the segments. In another embodiment, it may also be feasible to replace one or more segments for the input time series P with one or more corresponding segments for the input time series A if replacing the segments maintains pre-specified constraints/requirements.

The extrapolation module 136 may utilize the re-shaping module 138 and the extrapolation module 136 to forecast future data values based on actual data values and estimated data values.

Figure 15A:
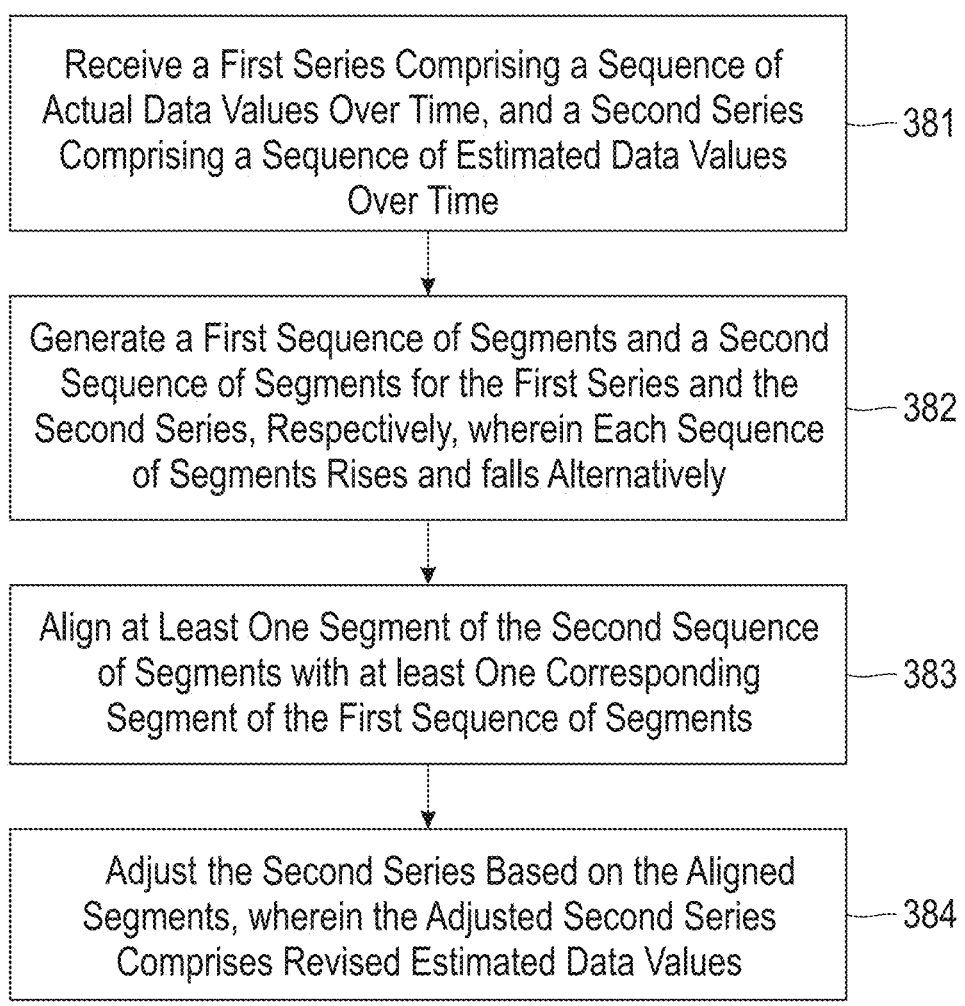
FIG. 15A illustrates a flowchart of an example process for generating revised estimated data values, according to an embodiment of the present invention.

FIG. 15A illustrates a flowchart of an example process 380 for generating revised estimated data values, according to an embodiment of the present invention. In process block 381, receive a first series comprising a sequence of actual data values over time, and a second series comprising a sequence of estimated data values over time. In process block 382, generate a first sequence of segments and a second sequence of segments for the first series and the second series, respectively, wherein each sequence of segments rises and falls alternatively. In process block 383, align at least one segment of the second sequence of segments with at least one corresponding segment of the first sequence of segments. In process block 384, adjust the second series based on the aligned segments, wherein the adjusted second series comprises revised estimated data values. An embodiment of the functions performed by process blocks 383 and 384 are described further above in relation to FIG. 14 and in particular in relation to re-shaping module 138.

Figure 15B:
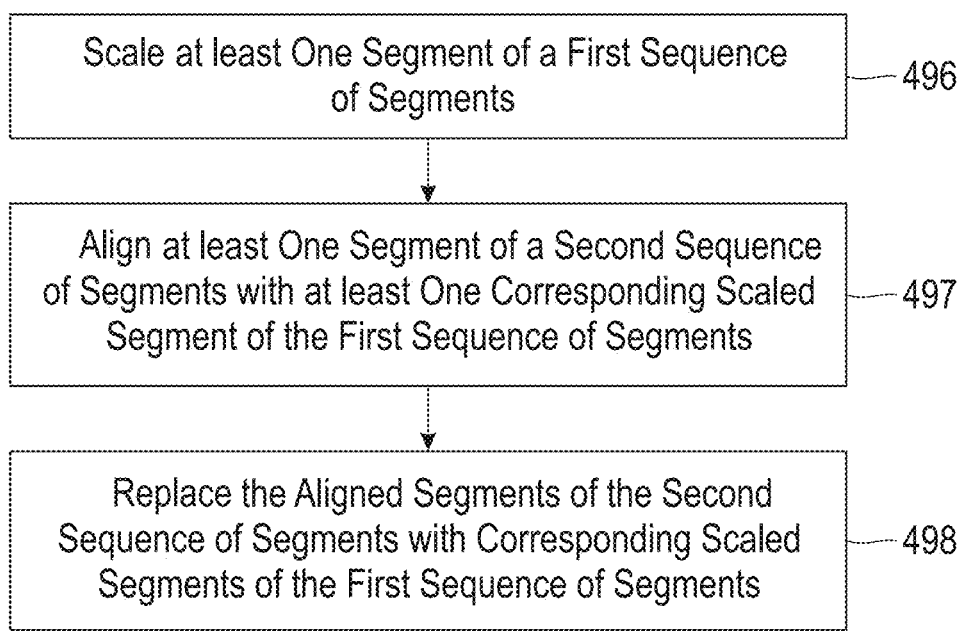
FIG. 15B illustrates a flowchart of an example process for aligning and re-shaping, according to an embodiment of the present invention.

FIG. 15B illustrates a flowchart of an example process 499 for aligning and re-shaping, according to an embodiment of the present invention. In process block 496, scale at least one segment of a first sequence of segments. In process block 497, align at least one segment of a second sequence of segments with at least one corresponding scaled segment of the first sequence of segments. In process block 498, replace the aligned segments of the second sequence of segments with corresponding scaled segments of the first sequence of segments. An embodiment of the functions performed by process blocks 496, 497 and 498 is described further above in relation to FIG. 14 and in particular in relation to re-shaping module 138.

Figure 16:
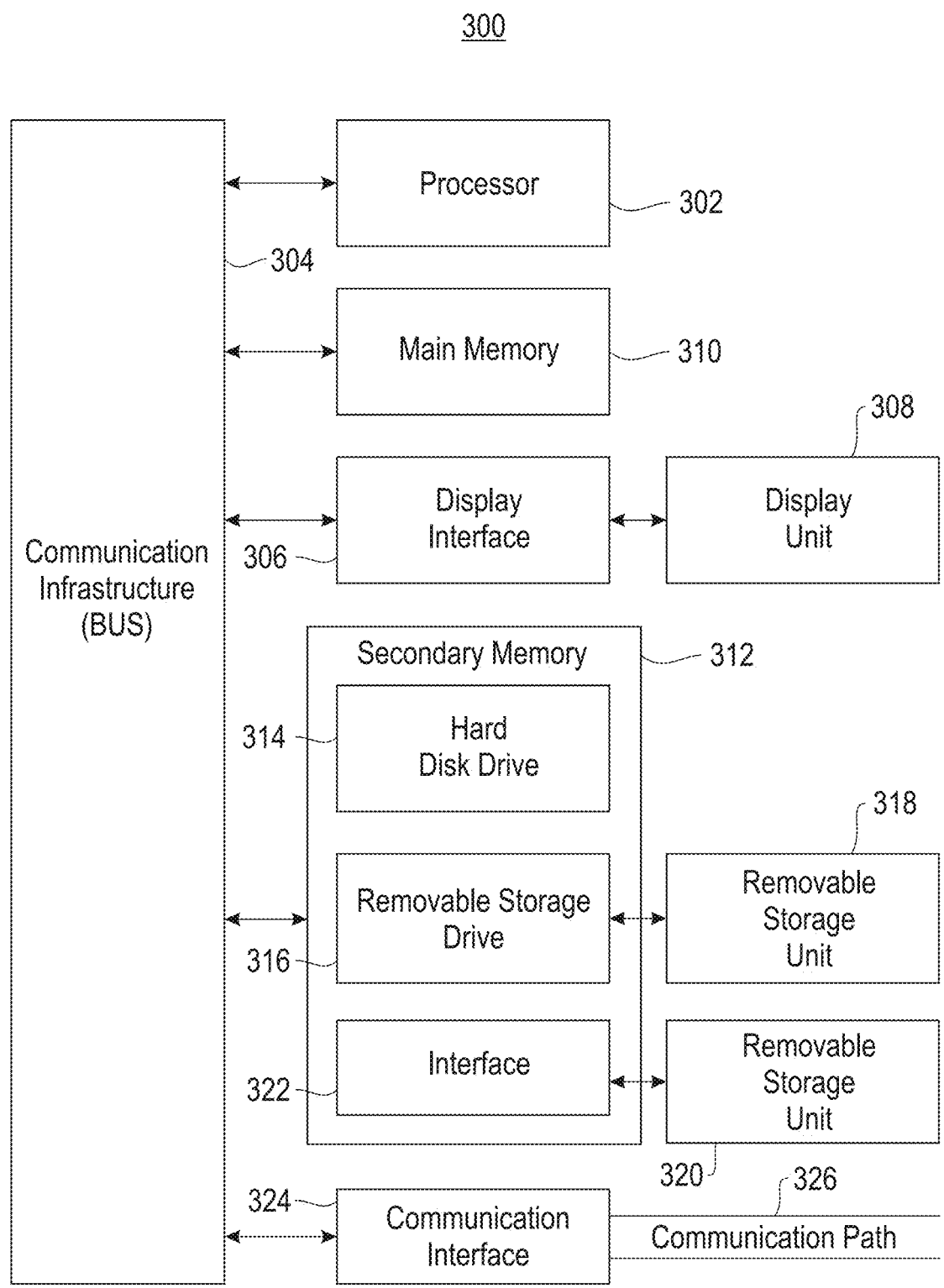
FIG. 16 is a high level block diagram showing an information processing system useful for implementing one embodiment of the invention.

FIG. 16 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention.

The present invention further provides a non-transitory computer-useable storage medium. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

retrieving, from at least one storage unit, historical ledger data comprising a first sequence of actual costs incurred by an ongoing service delivery project over time;

extrapolating, on at least one hardware processor, the first sequence of actual costs to a first end date scheduled in the future based on the historical ledger data;

retrieving, from the at least one storage unit, one or more cost cases comprising a second sequence of cost estimations for a planned service delivery project over time;

training, on the at least one hardware processor, an estimate model for the planned service delivery project based on the second sequence of cost estimations, wherein the estimate model has one or more corresponding model parameters;

further training, on the at least one hardware processor, the estimate model to fit actual costs included in the historical ledger data, wherein the further training comprises:

determining a difference between an aggregate of all estimate models trained and an aggregate of all historical ledger data retrieved; and minimizing the difference determined by adjusting one or more values of the one or more corresponding model parameters of the estimate model;

forecasting, on the at least one hardware processor, long-range cost estimations for the planned service delivery project based on the estimate model and the extrapolated first sequence of actual costs, wherein the long-range cost estimations represent cost estimations for the planned service delivery project up to a second end date scheduled in the future;

generating read-only, pre-indexed data based on the estimate model and the long-range cost estimations;

displaying an interactive user interface on a display device;

reporting forecasting results for the planned service delivery project via the interactive user interface, wherein the forecasting results comprises the read-only, pre-indexed data; and in response to user interaction with the forecasting results via the interactive user interface, updating the forecasting results based on the user interaction.

2. The method of claim 1, wherein the extrapolating comprises:
generating a typical model based on the historical ledger data; and
adding a scaled version of the typical model to an end of the first sequence of actual costs.

3. The method of claim 1, wherein the updating comprises:
filtering the forecasting results by domain in response to a user selection of the domain.

4. The method of claim 1, wherein the updating comprises:
grouping the forecasting results by one or more dimensions in response to a user selection of the one or more dimensions.

5. A system comprising a computer processor, a computer-readable hardware storage medium, and program code embodied with the computer-readable hardware storage device for execution by the computer processor to implement a system comprising:
retrieving, from at least one storage unit, historical ledger data comprising a first sequence of actual costs incurred by an ongoing service delivery project over time;
extrapolating, on at least one hardware processor, the first sequence of actual costs to a first end date scheduled in the future based on the historical ledger data;
retrieving, from the at least one storage unit, one or more cost cases comprising a second sequence of cost estimations for a planned service delivery project over time;
training, on the at least one hardware processor, an estimate model for the planned service delivery project based on the second sequence of cost estimations, wherein the estimate model has one or more corresponding model parameters;
further training, on the at least one hardware processor, the estimate model to fit actual costs included in the historical ledger data, wherein the further training comprises:
determining a difference between an aggregate of all estimate models trained and an aggregate of all historical ledger data retrieved; and
minimizing the difference determined by adjusting one or more values of the one or more corresponding model parameters of the estimate model;
forecasting, on the at least one hardware processor, long-range cost estimations for the planned service delivery project based on the estimate model and the extrapolated first sequence of actual costs, wherein the long-range cost estimations represent cost estimations for the planned service delivery project up to a second end date scheduled in the future;
generating read-only, pre-indexed data based on the estimate model and the long-range cost estimations;
displaying an interactive user interface on a display device;
reporting forecasting results for the planned service delivery project via the interactive user interface, wherein the forecasting results comprises the read-only, pre-indexed data; and
in response to user interaction with the forecasting results via the interactive user interface, updating the forecasting results based on the user interaction.

6. The system of claim 5, wherein the extrapolating comprises:
generating a typical model based on the historical ledger data; and
adding a scaled version of the typical model to an end of the first sequence of actual costs.

7. The system of claim 5, wherein the updating comprises:
filtering the forecasting results by domain in response to a user selection of the domain.

8. The system of claim 5, wherein the updating comprises:
grouping the forecasting results by one or more dimensions in response to a user selection of the one or more dimensions.

9. A computer program product comprising a tangible storage medium readable by a computer system and storing instructions for execution by the computer system for performing a method comprising:
retrieving, from at least one storage unit, historical ledger data comprising a first sequence of actual costs incurred by an ongoing service delivery project over time;
extrapolating, on at least one hardware processor, the first sequence of actual costs to a first end date scheduled in the future based on the historical ledger data;
retrieving, from the at least one storage unit, one or more cost cases comprising a second sequence of cost estimations for a planned service delivery project over time;
training, on the at least one hardware processor, an estimate model for the planned service delivery project based on the second sequence of cost estimations, wherein the estimate model has one or more corresponding model parameters;
further training, on the at least one hardware processor, the estimate model to fit actual costs included in the historical ledger data, wherein the further training comprises:
determining a difference between an aggregate of all estimate models trained and an aggregate of all historical ledger data retrieved; and
minimizing the difference determined by adjusting one or more values of the one or more corresponding model parameters of the estimate model;
forecasting, on the at least one hardware processor, long-range cost estimations for the planned service delivery project based on the estimate model and the extrapolated first sequence of actual costs, wherein the long-range cost estimations represent cost estimations for the planned service delivery project up to a second end date scheduled in the future;

generating read-only, pre-indexed data based on the estimate model and the long-range cost estimations;

displaying an interactive user interface on a display device;

reporting forecasting results for the planned service delivery project via the interactive user interface, wherein the forecasting results comprises the read-only, pre-indexed data; and in response to user interaction with the forecasting results via the interactive user interface, updating the forecasting results based on the user interaction.

10. The computer program product of claim 9, wherein the extrapolating comprises:

generating a typical model based on the historical ledger data; and adding a scaled version of the typical model to an end of the first sequence of actual costs.

11. The computer program product of claim 9, wherein the updating comprises:

filtering the forecasting results by domain in response to a user selection of the domain.

12. The computer program product of claim 9, wherein the updating comprises:

grouping the forecasting results by one or more dimensions in response to a user selection of the one or more dimensions.

13. The method of claim 2, wherein the adjusting the one or more values of the one or more corresponding model parameters of the estimate model minimizes one or more discrepancies between the estimate model and the typical model.

14. The system of claim 5, wherein the adjusting the one or more values of the one or more corresponding model parameters of the estimate model minimizes one or more discrepancies between the estimate model and the typical model.

15. The computer program product of claim 10, wherein the adjusting the one or more values of the one or more corresponding model parameters of the estimate model minimizes one or more discrepancies between the estimate model and the typical model.

* * * * *